(12) United States Patent
McKay et al.

(10) Patent No.: US 9,099,846 B2
(45) Date of Patent: Aug. 4, 2015

(54) PLUG AND PLAY CONTROL PANEL MODULE WITH INTEGRALLY SOCKETED CIRCUIT BOARD

(71) Applicant: Assembled Products, A Unit Of Jason Incorporated, Buffalo Grove, IL (US)

(72) Inventors: A. Todd McKay, Matteson, IL (US); Charles P. Bransford, Des Plaines, IL (US); Eric S. Brown, Tower Lakes, IL (US); Florin Boca, Elk Grove Village, IL (US); Ling Luo, Buffalo Grove, IL (US); Michael S. Williams, Bolingbrook, IL (US)

(73) Assignee: Assembled Products, A Unit of Jason Incorporated, Buffalo Grove, IL (US)

( * ) Notice: Subject to any disclaimer, the term of this patent is extended or adjusted under 35 U.S.C. 154(b) by 0 days.

(21) Appl. No.: 13/842,448

(22) Filed: Mar. 15, 2013

(65) Prior Publication Data
US 2014/0043732 A1    Feb. 13, 2014

Related U.S. Application Data

(60) Provisional application No. 61/674,189, filed on Jul. 20, 2012.

(51) Int. Cl.
*H02B 1/04* (2006.01)
*H02B 1/056* (2006.01)
*H02G 3/14* (2006.01)

(52) U.S. Cl.
CPC .. *H02B 1/04* (2013.01); *H02G 3/14* (2013.01); *H02B 1/056* (2013.01)

(58) Field of Classification Search
CPC ..... H05K 1/144; H05K 7/026; H05K 3/3447; H05K 2201/0187; H05K 2201/09045; H05K 2201/09118; H05K 2201/10053; H05K 3/182; H05K 3/202; H05K 5/0004; H05K 5/0204; H05K 5/0247; H05K 7/1465; H05K 7/01; G06F 1/26; G06F 1/3209; G06F 1/3246; G06F 1/1601; G06F 17/509; G06F 1/181; G06F 1/184; G06F 1/188; G06F 1/20; G06F 2200/1631; G06F 2217/36; H01H 2085/208; H01H 2009/187; H01H 2011/0081; H01H 2231/012; H01H 13/023; H01H 2219/014; H01H 2219/064; H01H 2221/016; H01H 2221/07; H01H 13/70; H01H 2003/0293; H01H 2217/01; H01H 2219/05; H01H 2221/004; H01H 2221/054
USPC .......................... 361/825–830; 439/761–762
See application file for complete search history.

(56) References Cited

U.S. PATENT DOCUMENTS 2,831,914 A     4/1958  Jacobs
3,550,063 A    12/1970  Lecocq (Continued)

*Primary Examiner* — Jenny L Wagner
*Assistant Examiner* — Ahmad D Barnes
(74) *Attorney, Agent, or Firm* — Boyle Fredrickson S.C.

(57) ABSTRACT

A plug and play control panel assembly having a circuit board with plug in sockets that receive a plurality of electrical components with the board seating in an enclosure having a cover attached that can help capture the components and board therebetween keeping the board seated and the components plugged in. The board includes at least one socket for a power receptacle having outwardly extending terminal blades received in socket slots. One preferred socket is configured for blades of a duplex 120 volt receptacle plugged into a board that preferably is an insert molded circuit board. A control panel module is produced having an insert molded board with plug in sockets on one side for receiving electrical components and at least one plug in socket on its opposite side defining a "plug and play" control panel module that is removably plugged into a larger apparatus during apparatus assembly.

27 Claims, 17 Drawing Sheets

(56) References Cited

U.S. PATENT DOCUMENTS

| | | |
|---|---|---|
| 3,848,224 A | 11/1974 | Olivero |
| 4,755,776 A | 7/1988 | Preschutti |
| 5,405,267 A | 4/1995 | Koegel et al. |
| 6,313,543 B1 | 11/2001 | Frank |
| 7,104,847 B2 | 9/2006 | Sodemann et al. |
| 7,224,578 B2 | 5/2007 | Buck et al. |
| 7,288,740 B2 | 10/2007 | Radtke |
| 7,365,964 B2 | 4/2008 | Donahue, IV |
| 7,488,904 B2 | 2/2009 | Maegawa et al. |
| 7,511,451 B2 | 3/2009 | Pierce |
| 7,614,896 B2 | 11/2009 | Johnson et al. |
| 2003/0176101 A1 | 9/2003 | Miller, Jr. |
| 2005/0081377 A1 | 4/2005 | Brandenburg et al. |
| 2006/0027394 A1 | 2/2006 | Brandenburg et al. |
| 2009/0085248 A1 | 4/2009 | Brandenburg et al. |
| 2010/0117308 A1 | 5/2010 | Dell'Eva et al. |

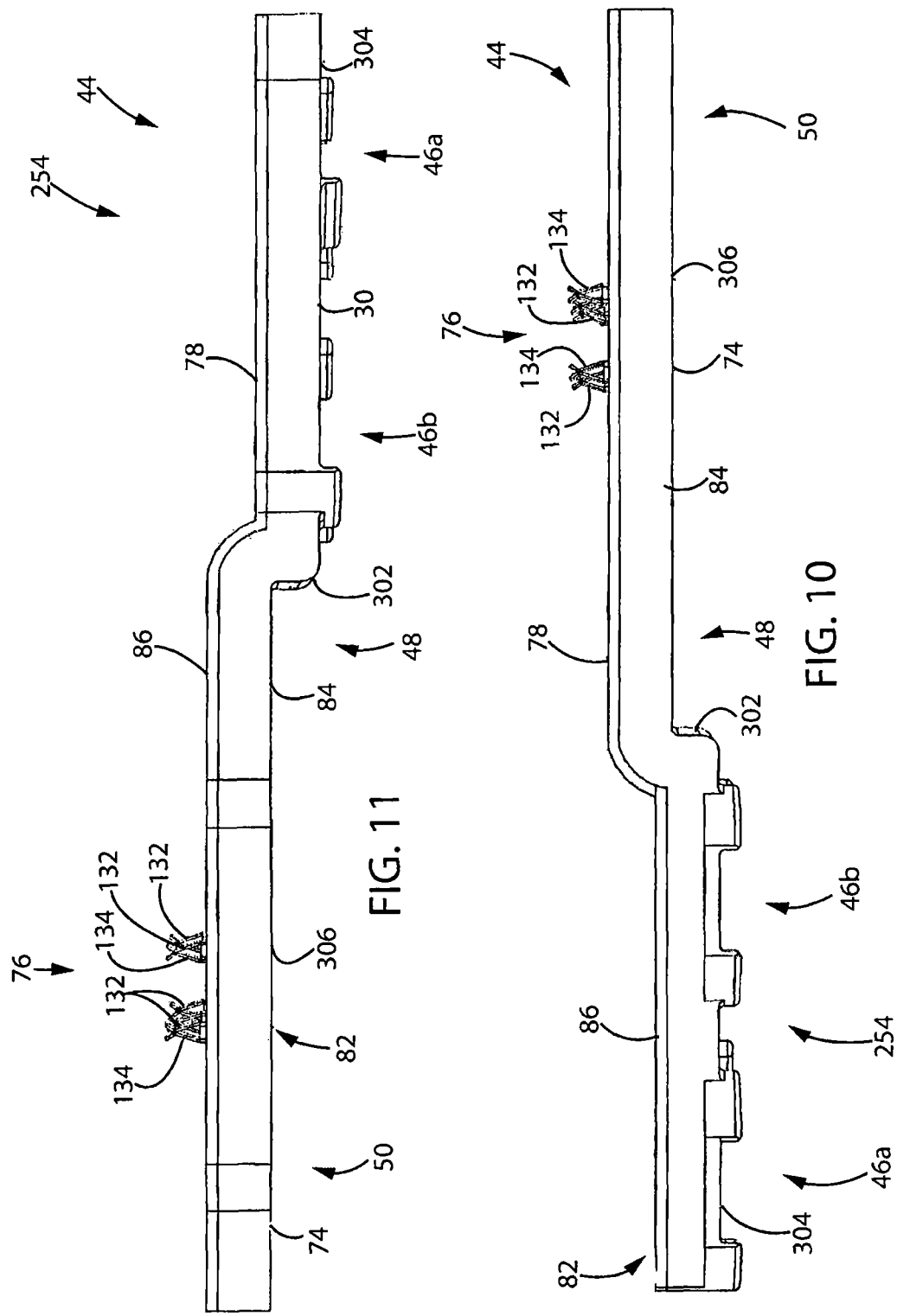

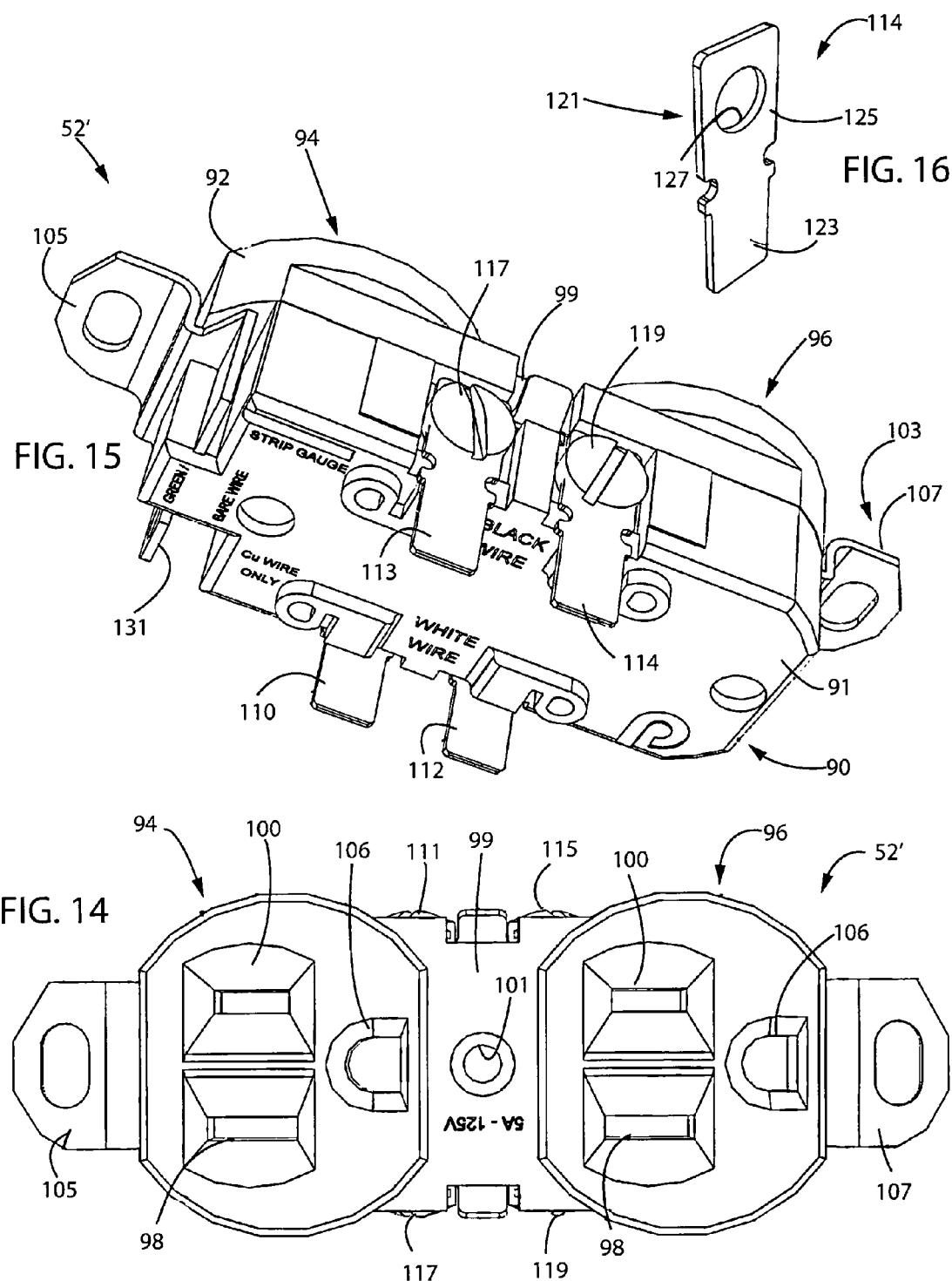

PLUG AND PLAY CONTROL PANEL MODULE WITH INTEGRALLY SOCKETED CIRCUIT BOARD

CROSS REFERENCE

This application claims priority in U.S. Provisional Patent Application No. 61/674,189, filed Jul. 20, 2012, under 35 U.S.C. §119(e), the entirety of which is hereby expressly incorporated herein by reference.

FIELD

The present invention is directed to a control panel assembly and more particularly to a control panel assembly that employs a socketed circuit board into which electrical components, including power receptacles, are plugged forming a control panel module of "plug and play" construction.

BACKGROUND

Power equipment, including generators and welders, have an onboard control panel assembly to which electrical power conducting cords, cables, and the like are removably plugged. Generators, for example, typically have a control panel assembly that includes at least one resettable circuit breaker and at least one power outlet into which the power cord of a 120 volt appliance drawing at least 10 amps or a 220-240 volt appliance drawing at least 5 amps can be plugged. As a result, such high amperage—high voltage control panel assemblies must be constructed to deliver as much as 30 amps of electrical current to a single power receptacle, typically a 120-125 volt duplex receptacle, at a voltage of at least 110 volts. Many generators are equipped with relatively sophisticated control panel assemblies that include two or more 120-125 volt power outlets, at least one "twist-lock" power outlet of 120/240 and/or 125 volt construction, and at least one resettable circuit breaker. Some generators have even more sophisticated control panel assemblies that further include an hour meter, a resettable circuit breaker for each power outlet, and an electronic display, such as for displaying an operating condition, e.g., voltage, amperage, engine speed, fuel level, etc. of the generator.

As a result of the relatively large electrical currents and high voltages distributed by such high amperage—high voltage control panel assemblies, the power outlets are electrically connected using insulated wires capable of handling (a) at least 10 amps and as much as 30 amps of current at a voltage of 120 volts, and (b) at least 5 amps and as much as 15 amps of current at a voltage of between 220 and 240 volts. Wires are used in such a high amperage—high voltage control panel assembly not only to electrically connected the electrical power receptacles, but quite often to electrically connect all of the electrical components of the control panel assembly, including the electrical input connector used to connect the control panel assembly to the piece of equipment on which it is used as a control panel.

The wires must be manually attached to each electrical component of such a control panel assembly, which is time consuming and costly. The wires also take up a great deal of space requiring a relatively large control panel assembly enclosure to house the wires that is undesirably large and bulky. Just as bad, if not worse, is that the resultant maze of wires inside such a control panel assembly makes troubleshooting and fixing control panel problems a time consuming and challenging ordeal.

Using wires to electrically connect the electrical components during assembly of such high amperage—high voltage control panel assemblies requires the person manually attaching the wires to accurately and properly attach each wire. If even one wire is improperly connected or connected to the wrong electrical component, the control panel assembly will not work and can even damage the equipment to which the control panel assembly is attached. Even worse is when an incorrectly connected wire causes an electrical short as it can lead to an electrical fire in the control panel assembly.

The wires used to connect the electrical components are either soldered or manually attached using terminals at one or both ends of each connecting wire. Both types of electrical connections are not without considerable drawbacks however.

Where soldered electrical connections are used, the resultant electrical connection may be of poor quality that can cause control panel malfunction, arc during operation, and can even electrically short out. Quite often, soldered connections degrade over time as oxidization occurs and as a result of being subjected to vibration during shipping and operation of the equipment to which the control panel assembly is attached. It is therefore not unusual for a control panel assembly with poorly soldered electrical connections to pass quality control only to fail out in the field. Where under warranty, such premature failure undesirably causes expensive warranty costs to be incurred. Where not under warranty, such failure can lead to significant customer dissatisfaction.

Where wires are connected using solderless connections, such as female quick connect/disconnect terminals, ring tongue terminals, and/or spade tongue terminals, problems still arise. If the wire terminals are not properly connected, poor quality electrical connections can lead to quality control refurbishment and, if not detected during quality control testing, premature failure. Even when properly connected, vibration encountered during shipping and equipment operation can degrade the quality of the electrical connection over time undesirably leading to problems that can require warranty costs to be incurred and which can lead to premature malfunction or failure.

What is needed is a control panel assembly that overcomes at least some of these drawbacks.

SUMMARY

The present invention is directed to a control panel assembly having an electronic component mounting board with plug in sockets into which a plurality of electrical components are plugged that is received in an enclosure and held captive by a cover attached to the enclosure producing a control panel module that can be quickly and easily plugged into an apparatus to which the control panel is being assembled. In a preferred embodiment, the board is an insert molded circuit board having an inner electrically conductive layer with terminal blade engaging contacts in registry with socket slots into which terminal blades of an electronic component is inserted when plugging the electronic component into the board. Each plug in socket is also configured to properly locate the electrical component plugged into it relative to the board and relative to the cover of the control panel assembly when assembly is completed.

The enclosure and board are three dimensionally configured to properly locate the board relative to the enclosure and securely seat the board within the enclosure during assembly without using any fastener to attach the board to the enclosure. The enclosure and board have a seating arrangement that includes a plurality of locators that cooperate with one another to properly locate and seat the board in the enclosure during assembly producing a "mistake proof" assembly. In one embodiment, locator pins of one of the enclosure and board are received in locator bores in the other one of the enclosure and board. In a preferred embodiment, the enclosure has a plurality of locator pins received in locator bores formed in the board to accurately locate the board during assembly to the enclosure ensuring the board is always properly oriented relative to the enclosure and the cover of the control panel assembly.

Where the control panel assembly has electrical components of different heights, the board can have sections at different elevations divided by an offset that enables the electrical components to be received in access openings formed in a generally planar control panel cover. In a preferred embodiment, a bottom wall of the enclosure is divided by a wall offset into bottom sections of different elevations with the board offset in registry or mating with the wall offset further helping to locate and seat the board in the enclosure.

In a preferred board embodiment, the board includes a plurality of integrally formed power receptacle plug in sockets having one plug in socket configured for receiving terminal blades of a 120 volt duplex receptacle and another plug in socket configured for either receiving another duplex receptacle or a different power receptacle that can be a twist lock receptacle, such as a 120/240 volt receptacle. Such a board can also include one or more plug in sockets for another electrical component, such as preferably a circuit breaker that provides overload protection to one or more of the power receptacles plugged into the board.

In a preferred embodiment, a plurality of electrical component plug in sockets is integrally formed in one side of the board and at least one other plug in socket is disposed on an opposite of the board. In one preferred board embodiment, the board has an integrally formed socket on the opposite side having terminal blade engaging contacts extending outwardly from the board that are in line with an electrical connector coupling integrally formed of part of the enclosure that preferably is a bottom wall of the enclosure.

In a preferred embodiment, the board is an insert molded circuit board having an inner electrically conductive layer that can be a spider stamped of an electrically conductive sheet forming the terminal blade engaging contacts of the plug in sockets of the board. The electrically conductive inner layer is substantially enclosed in an electrically insulating housing that can be molded or adhesively secured together around the electrically conductive inner layer. Where the board includes sockets on both sides of the board, the terminal blade engaging contacts of one of the sockets can be stamped or otherwise formed to extend outwardly beyond the board such as where needed to produce a plug in socket having an electrical connector coupling integrally formed of part of the enclosure.

In one preferred embodiment, a control panel assembly constructed in accordance with the present invention has a plurality of electrical components that plug into a board that seats in a control panel enclosure without using any fastener to attach the board to the enclosure, without using any fastener to attach any one of the electrical components to any part of the control panel assembly, and without using any wires or soldering. A control panel assembly constructed in accordance with the present invention has a cover configured to abut electrical components plugged into the board keeping them plugged into the board and the board securely seated in the enclosure when the cover is attached to the enclosure.

In another preferred embodiment, one or more fasteners, such as screws, bolts, Christmas tree fasteners, or the like can be used to fix the board to the enclosure. Similarly, one or more fasteners can also be used to attach one or more or even all of the electrical components to the board. The cover can abut one or more of the electrical components to help support them as well as to help keep them anchored to the board.

A control panel assembly constructed in accordance with the present invention advantageously produces a control panel module of simple construction, that uses few parts, that requires less labor, steps and time to assemble, and which produces a control panel module of plug and play construction that can be plugged into an electrical connector of an apparatus to which it is being assembled. A control panel assembly constructed in accordance with the present invention has an insert molded circuit board of economical construction that is of plug and play construction enabling a plurality of electrical components to be located when plugged into the board. An insert molded circuit board of a control panel assembly constructed in accordance with the invention has an electrically conductive inner layer configured to provide electrical component sockets facing in opposite directions enabling electrical components and/or electrical connectors or coupling to be plugged into opposite sides of the board producing a modular control panel that also is of plug and play construction enabling it to be plugged as a preassembled unit or subassembly into something else as part of its assembly.

These and various other features, aspects, and advantages of the present invention will be made apparent from the following descriptions of the drawings and detailed description.

BRIEF DESCRIPTION OF THE DRAWINGS

One or more preferred exemplary embodiments of the invention are illustrated in the accompanying drawings in which like reference numerals represent like parts throughout and in which:

FIG. 10 is a side elevation view of one side of the electrical component mounting board;

FIG. 11 is a side elevation view of the other side of the electrical component mounting board;

FIG. 14 is a top plan view of a duplex power receptacle equipped with a plurality of male spade or blade-type electrical terminals;

FIG. 15 is a bottom perspective view of the duplex receptacle of FIG. 14;

FIG. 16 is a perspective view of a preferred embodiment of a male spade or blade type male terminal attached to the duplex receptacle shown in FIGS. 14 and 15;

Figure 2:
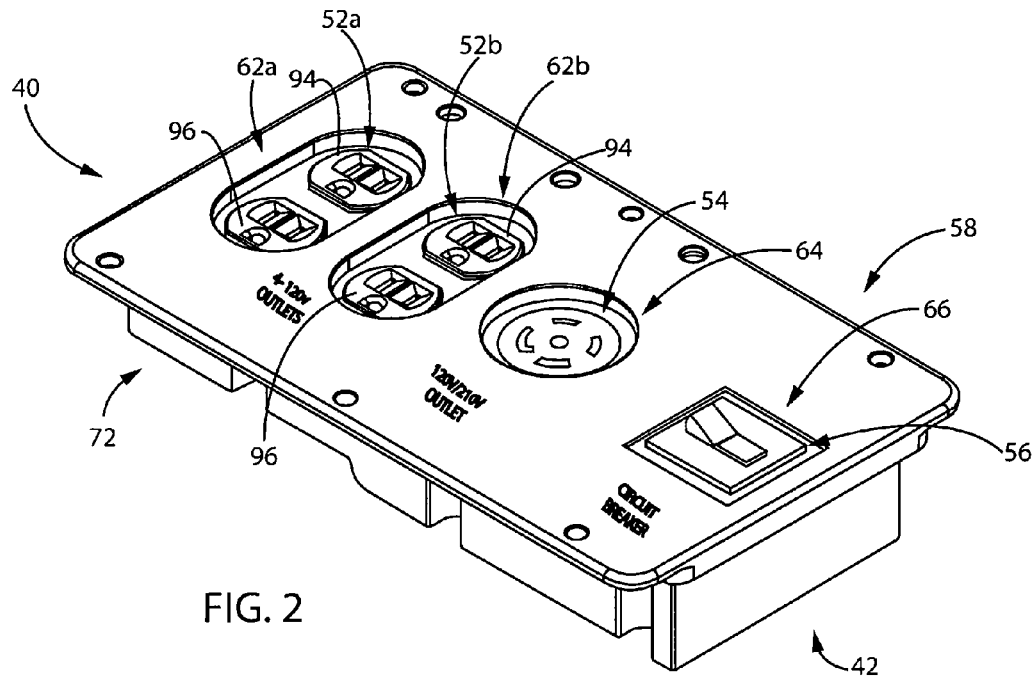
FIG. 2 is a perspective view of the assembled control panel assembly shown in FIG. 1 showing an enclosure to which the cover panel.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 3:
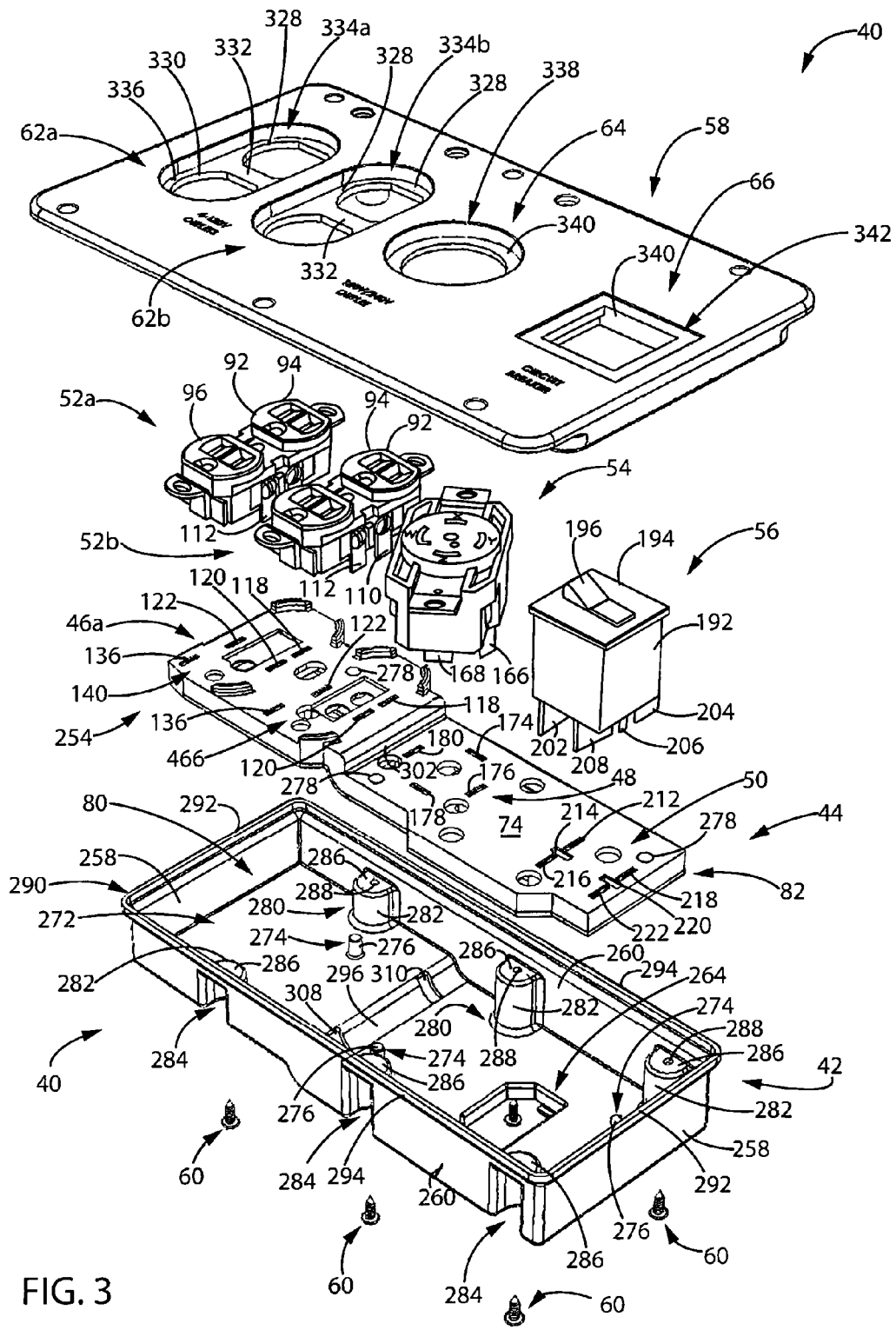
FIG. 3 is an exploded top right perspective view of a control panel assembly of FIGS. 1 and 2.
Figure 4:
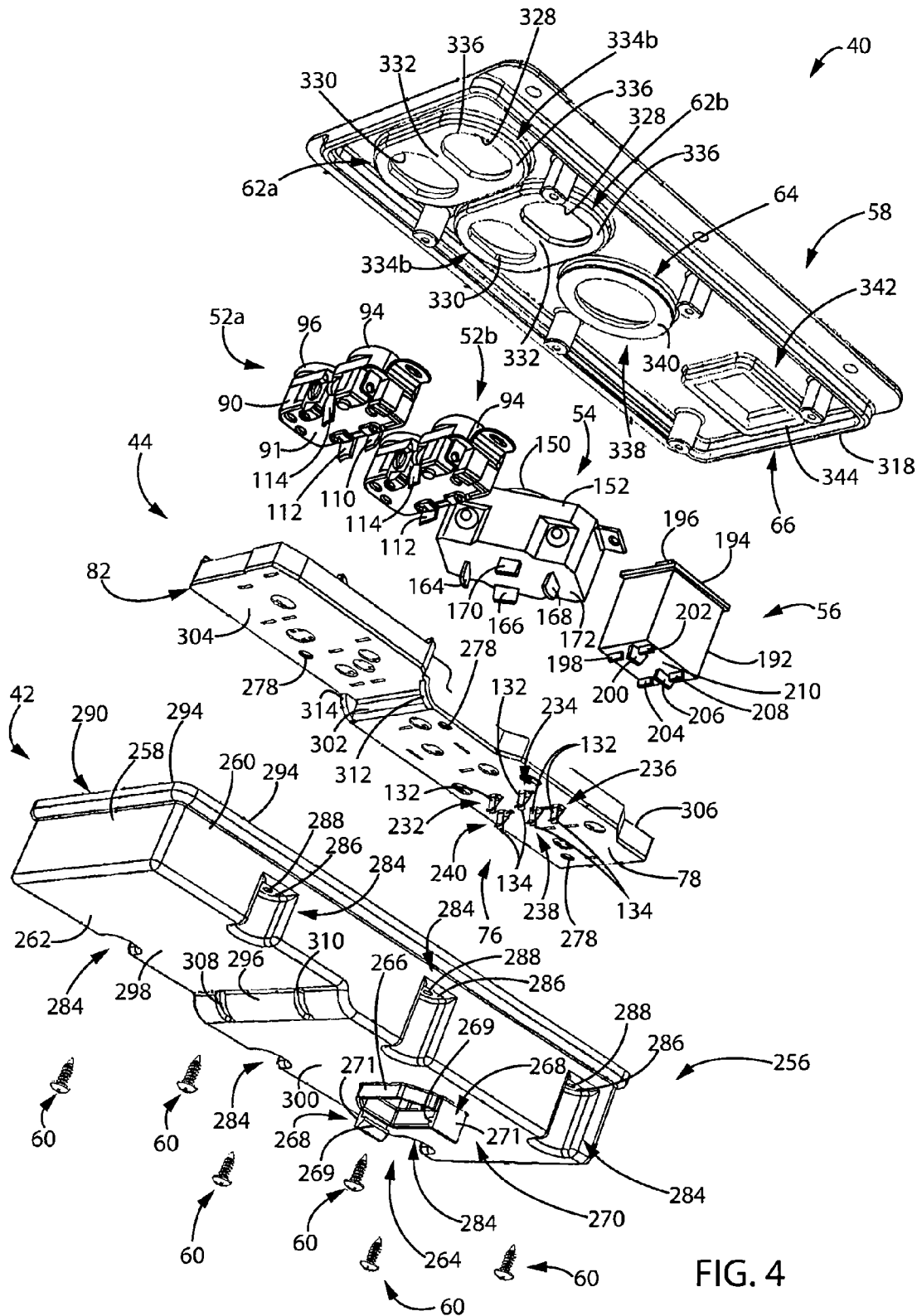
FIG. 4 is an exploded bottom left perspective view of the control panel assembly of FIG. 3.

FIGS. 1-4 illustrate a control panel assembly 40 having an enclosure 42 that receives an electrical component mounting board 44 (FIGS. 3 and 4) having a plurality of plug-in sockets 46a, 46b, 48 and 50 (FIGS. 3 and 4), into which a plurality of electrical components 52a, 52b, 54 and 56 are plugged with the electrical components 52a, 52b, 54 and 56 and the board 44 held captive by a control panel cover 58 attached to the enclosure 42 by fasteners 60 (FIGS. 3 and 4). The cover 58 has a plurality of access openings 62a, 62b, 64, and 66 integrally formed therein that respectively overlie a corresponding one of the electrical components 52a, 52b, 54 and 56 plugged into the board 44 when the cover 58 is attached to the enclosure 42 enabling user viewing and/or user access of each electrical component 52a, 52b, 54 and 56.

The enclosure 42 can include an integrally formed opening 68 of a control panel connector coupling 70 in registry with an electrical socket 76 integrally formed of the board 44 that receives a plug (not shown) of a connector (not shown) of an electrical cable or an apparatus to which the control panel assembly 40 is electrically connected during assembly of and/or to an apparatus, such as an electrical power generator, a welder, a piece of power equipment, an automotive vehicle, another piece of equipment, or the like. An assembled control panel assembly 40 constructed in accordance with the present invention advantageously produces a control panel module 72 of plug-and-play construction that is easily pluggable as a unit into another assembly, subassembly, piece of equipment, machine, or the like.

In the preferred control panel embodiment shown in FIGS. 1-4, a plurality of the electrical components 52a, 52b, and 54 are configured to provide or facilitate power distribution, including enabling electrical power to be transferred to and/or from the control panel assembly 40. In the preferred embodiment shown in the drawings, a plurality of the electrical components 52a, 52b, and 54 are power receptacles from which power can be outputted, such as to an electrically powered device requiring 115 volt-125 volt alternating current and/or 220-240 volt three phase current to operate. In the preferred embodiment shown in the drawings, the control panel assembly 40 has a plurality of 120 volt duplex receptacles 52a and 52b, a 120/240 volt power receptacle 54, and a circuit breaker 56 used to prevent overloading of power distributed from one or more of the power receptacles 52a, 52b, and 54.

Figure 1:
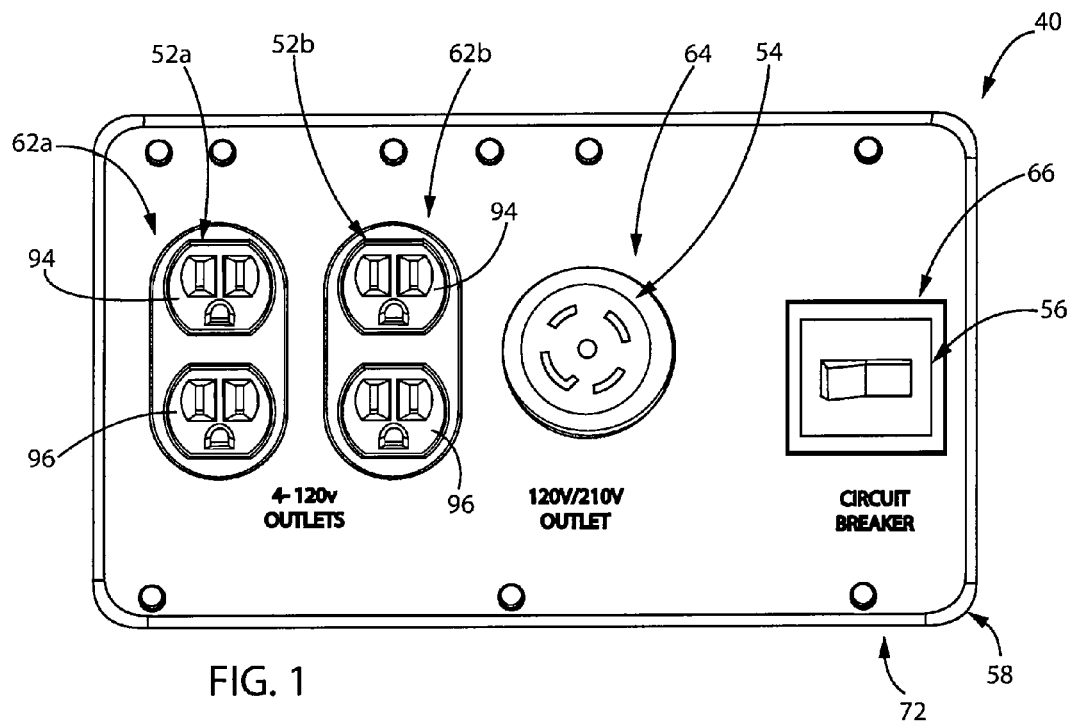
FIG. 1 is a top plan view of an assembled control panel assembly that is a control panel module showing a plurality of user-accessible electrical components that are accessible through corresponding access openings formed in the control panel cover.

When the control panel assembly 40 is assembled, it forms a plug and play control panel module 72 configured for consumer, commercial and/or industrial electrical power distribution applications. For example, the control panel module 72 shown in FIGS. 1 and 2 is configured to be attached to an electrical power generator, such as a gasoline, diesel or natural gas powered generator, by being plugged into part of the generator during generator assembly, such as by being plugged into a cable of the generator during generator assembly. A control panel module 72 constructed in accordance with the present invention can also be used with other high voltage and/or high amperage power equipment, such as electric welders and the like, having at least one electrical component capable of accepting or outputting electrical current of at least 10 amps at a voltage of between 115 volts and 125 volts, such as duplex power receptacle 52a and 52b, or capable of accepting or outputting electrical current of at least 5 amps at a voltage of between 220 volts and 240 volts, such as 120/240 volt receptacle 54.

A control panel assembly 40 constructed in accordance with the present invention has an electronic component mounting board 44 with plug-in sockets 46a, 46b, 48 and 50 that enable each one of the electrical components 52a, 52b, 54 and 56 to be plugged into the board 44 in a "mistake proof" manner that ensures proper location of the electrical components 52a, 52b, 54 and 56 while eliminating the wires and mis-wiring problems of the prior art control panel assemblies. The plug-in sockets 46a, 46b, 48 and 50 also ensure that the electrical components 52a, 52b, 54 and 56 are properly located and oriented relative to the access openings 62a, 62b, 64, and 66 in the cover 58 when control panel assembly is completed.

In a preferred embodiment, the board 44 is configured with plug-in sockets 46a, 46b, 48 and 50 that enable each one of the electrical components 52a, 52b, 54 and 56 accessible via the control panel cover 58 to be respectively plugged into the board 44 in a "mistake proof" manner that properly locates the electrical components 52a, 52b, 54 and 56 without using any fasteners to attach any of the electrical components 52a, 52b, 54 and 56 to the board 44 and without using any wires connected to any of the components 52a, 52b, 54 and 56. The preferred embodiment of the electronic component mounting board 44 shown in the drawing figures has a plurality of sockets 46a, 46b, 48 and 50 on one side 74 of the board 44 to which a plurality of electrical components 52a, 52b, 54 and 56 are quickly and easily plugged and at least one socket 76 on the opposite side 78 of the board 44 that quickly and easily receives a plug (not shown) of a connector (not shown) plugged in during attachment of the control panel module 72 to an apparatus that can be a generator, welder, or the like.

In one preferred board embodiment, such as the board 44 shown in FIGS. 3-11, the board 44 has a plurality of female plug-in sockets 46a, 46b, 48 and 50 on one side 74 of the board 44 and a female control module connector plug-in socket 76 on the other side 78 of the board 44. In another preferred embodiment, such as the board 44' depicted in FIG. 13, the board 44 has a plurality of female plug-in sockets 46a, 46b, 48 and 50 on one side 74 of the board 44 and a male control module plug-in connector socket 76' on the other side 78 of the board 44. If desired, one or more of the female sockets 46a, 46b, 48 and 50 can be formed as a male socket like the male socket 76' shown in FIG. 13.

A control panel assembly 40 constructed in accordance with the present invention has an enclosure 42 three dimensionally configured in a manner that properly locates and securely seats the electrical component mounting board 44 within a cavity 80 of the enclosure 42. In the preferred embodiment shown in the drawing figures, the control panel enclosure 42 is three dimensionally configured in a manner that properly locates and securely seats the electrical component mounting board 44 within a cavity 80 of the enclosure 42 without using any fasteners to secure or otherwise attach the board 44 to the enclosure 42.

If desired, one or more fasteners, such as screws, bolts, clips, e.g., Christmas tree clips, or the like can be used to secure or otherwise attach the board 44 to the enclosure 42. If desired, the enclosure 42 can be configured with one or more tabs, fingers or the like integrally formed therein that receive and retain the board 44 securing or attaching the board 44 to the enclosure 42. Such tabs, fingers or the like can be configured to provide snap-fit engagement between adjacent corresponding outer edges of the board 44 and the enclosure 42 securing or attaching the board 44 to the enclosure 42. Such attachment can be releasable thereby enabling removal and servicing of the board 44 from the enclosure 42 and/or removal and replacement of the board 44.

In a preferred control panel assembly embodiment, at least a plurality of electrical components 52a, 52b, 54 and/or 56 plugged into a board 44 that has been mounted in the enclosure 42 can be clamped between the control panel enclosure 42 and the control panel cover 58 when the cover 58 is attached to the enclosure 42 in assembling the control panel assembly 40. In one preferred embodiment, the cover 58 clamps a plurality of electrical components 52a, 52b, 54 and/or 56 plugged into the board 44 between the cover 58 and enclosure 44 without using any fasteners other than the fasteners 60 used to attach the cover 58 to the enclosure 44. A control panel assembly 40 constructed in accordance with the present invention, advantageously produces an assembled control panel module 72 made without using wires, assembled using a minimum of assembly steps, which uses fewer components, minimizes use of fasteners, and which is of plug and play construction that quickly and easily plugs into an apparatus, such as a generator or welder, to which the control panel module 72 is being assembled.

Figure 5:
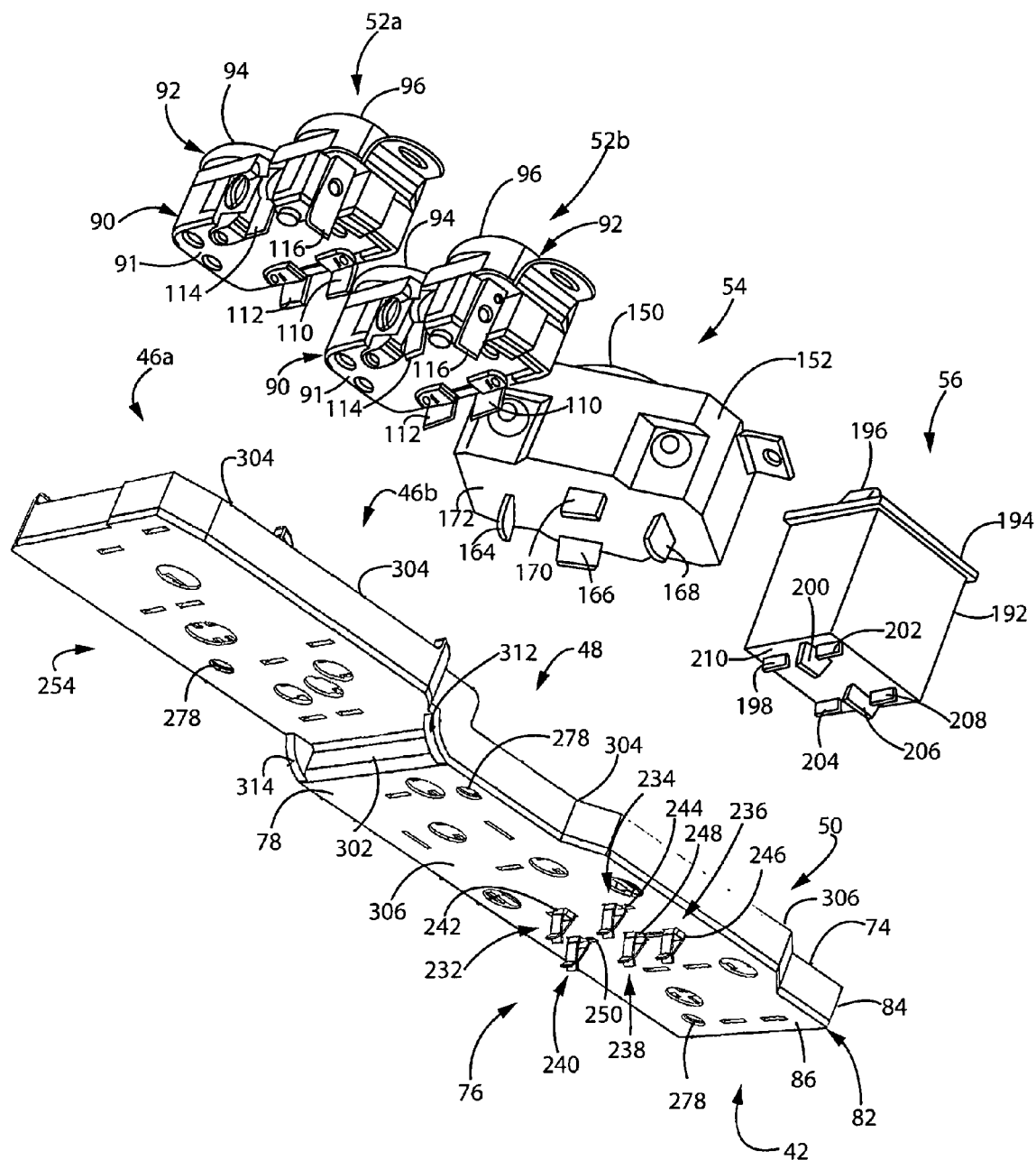
FIG. 5 is an exploded bottom perspective view of an electrical component mounting board and electrical components that plug into sockets in the board.
Figure 6:
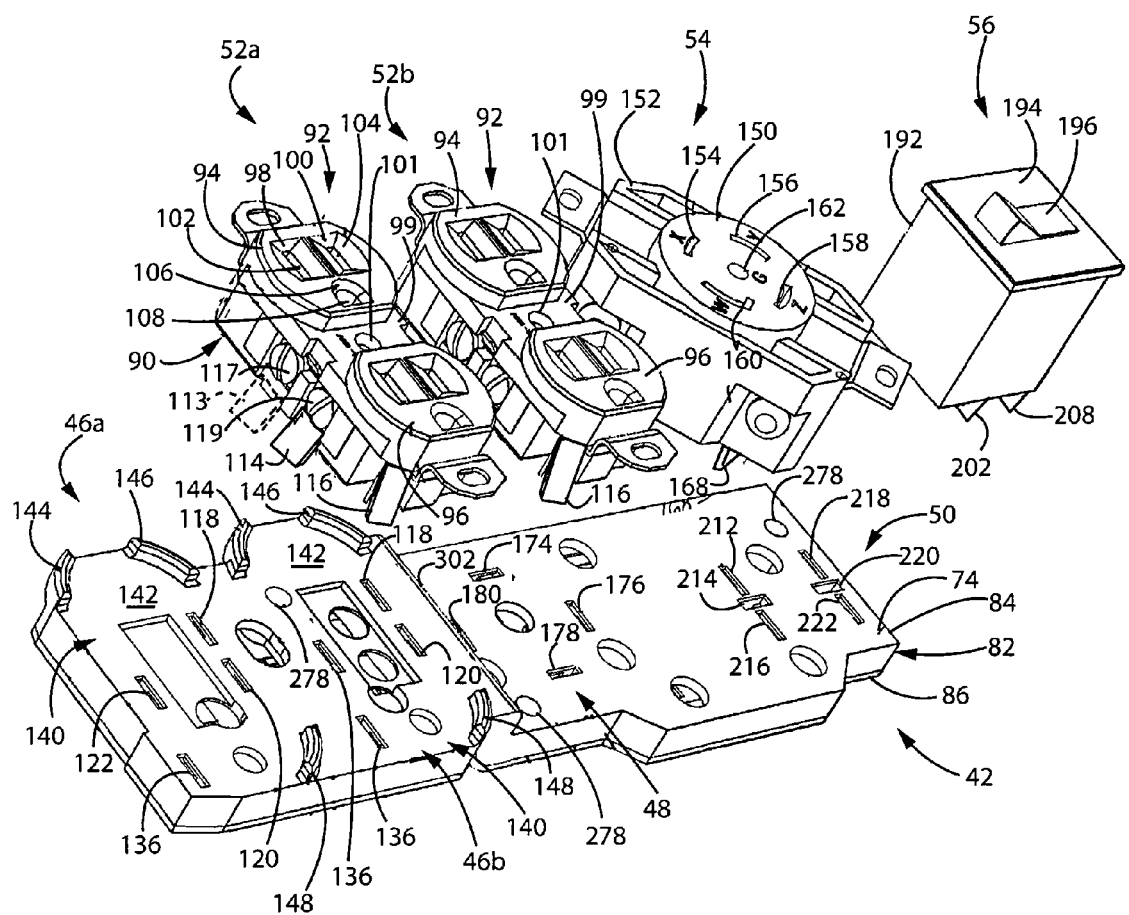
FIG. 6 is an exploded top perspective view of the electrical components and electrical component mounting board shown in FIG. 5.

With additional reference to FIGS. 5 and 6, the side 74 of the electronic component mounting board 44 that faces toward the cover 58 when the control panel module 72 is assembled has a pair of 120 volt duplex receptacle sockets 46a and 46b arranged side by side one another adjacent to a 120/240 volt receptacle socket 48. The cover-facing side 74 of the board 44 also has a circuit breaker socket 50 located next to the 120/240 volt receptacle socket 48.

If desired, the board 44 can be configured with additional sockets that enable additional power receptacles to be plugged into the board 44 and can also be configured with sockets for other types of electrical components. For example, the board 44 can further include a socket (not shown) configured to receive another type of electrical component such as an hour meter, volt meter, amp meter, watt meter, or another type of electrical component having a visually perceptible indicator plugged into the socket.

Figure 7:
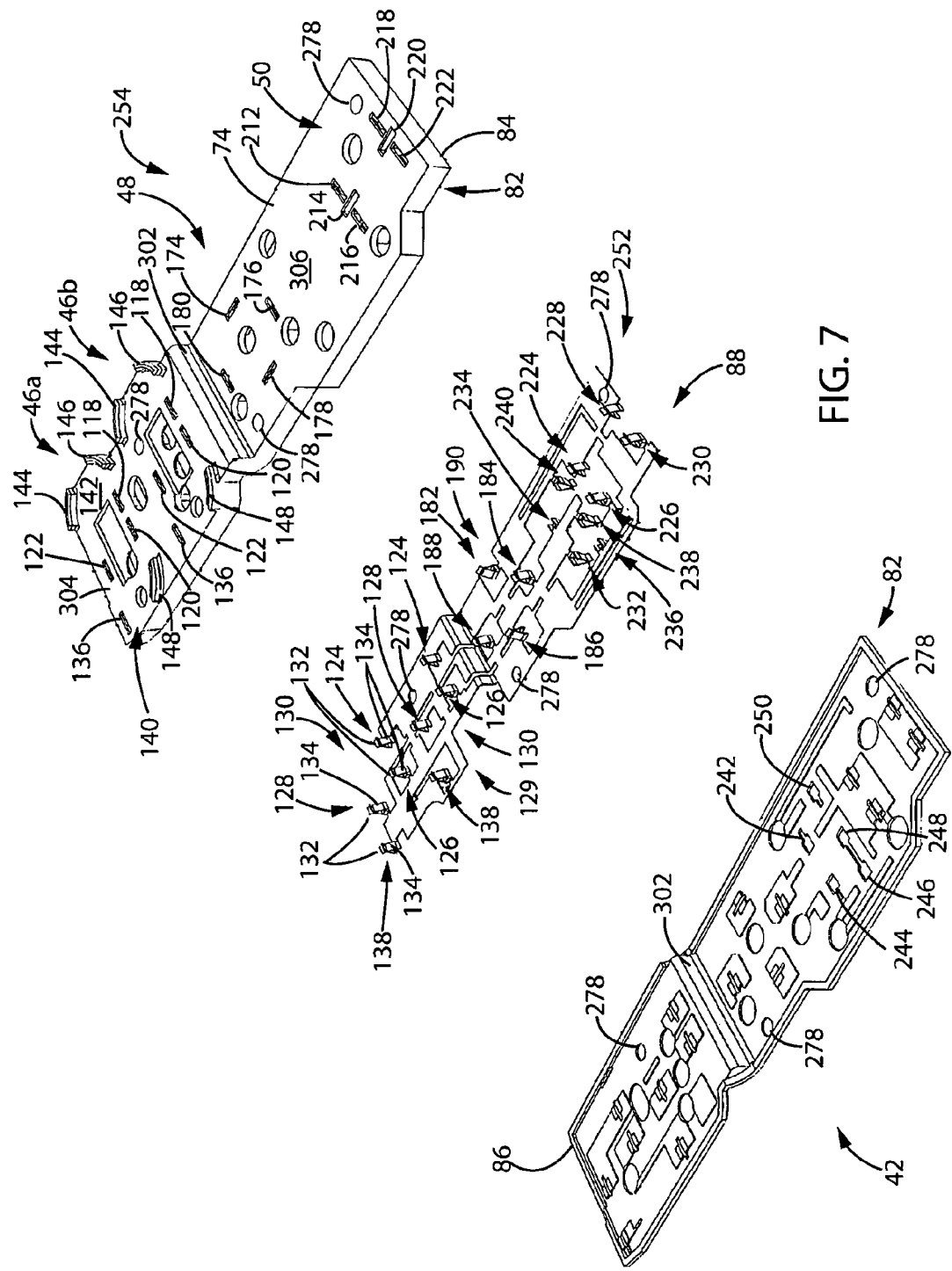
FIG. 7 is an exploded view of a preferred embodiment of an electrical component mounting board.

With reference to FIG. 7, the board 44 has an outer housing 82 that can be formed of two halves 84 and 86 made of an electrically insulating material, e.g., plastic, surrounding an electrically conductive inner layer 88 that makes electrical contact with each one of the electrical components 52a, 52b, 54 and 56 when the components 52a, 52b, 54 and 56 are plugged into the board 44. The electrically conductive inner layer 88 is made of an electrically conductive material, such as copper, aluminum, steel, gold, silver, a gold coated material, a silver coated material, or another type of electrically conductive material. As is also shown in FIG. 6, each socket 46a, 46b, 48 and 50 includes a plurality of contact-receiving openings formed in the cover-facing side 74 of the outer housing 82 of the board 44 with each contact-receiving opening disposed in registry with a corresponding underlying electrical contact of the electrically conductive inner layer 88 receiving within the housing 82 of the board 44.

As discussed in more detail below, each socket 46a, 46b, 48 and 50 is configured for "mistake proof" location of the corresponding electrical component 52a, 52b, 54 and 56 when plugged into the socket that ensures proper electrical connection of each electrical component. This not only advantageously eliminates the wiring problems that plagued wired prior art control panel assemblies, but also does so in a manner that eliminates shorts and prevents arcing during control panel assembly operation.

With reference once again to FIGS. 5 and 6, each duplex receptacle 52a and 52b has a base 90 carrying an outlet plate 92 having a pair of spaced apart outlets 94 and 96 each configured to receive the blades or prongs of a conventional alternating current plug (not shown), such as a NEMA 1-15 and/or NEMA 5-15 plug, typically connected to an electric power cord of an electrically powered device or appliance. As is best shown in FIG. 6, extending between each outlet 94 and 96 can be a recessed interconnecting bridge 99 having an opening 101 that receives a threaded fastener (not shown) typically used to attach a wall cover. With continued reference to FIG. 6, each outlet 94 and 96 has a pair of blade or prong receiving slots 98 and 100 in registry with a corresponding electrical contact 102 and 104 disposed between the outlet plate 92 and base 90 with one of the contacts 102 being a neutral or positive contact and the other one of the contacts 104 being a hot or negative contact. Each outlet 94 and 96 can also have an opening 106 in registry with a ground contact 108 that receives the ground prong of a conventional alternating current plug. In a preferred embodiment, each duplex receptacle 52a and 52b employs a NEMA 1-15, NEMA 5-15, or NEMA 5-20 socket but can be configured with another type of NEMA socket if desired.

As is best shown in FIG. 5, each duplex receptacle 52a and 52b has a plurality of pairs, i.e., at least three, of generally straight outwardly extending electrically conductive terminal blades 110, 112, 114 and/or 116 carried by the receptacle base 90 that plug into a corresponding one of sockets 46a and 46b in a manner that properly locates the receptacle 52a and 52b so it makes a proper electrical connection and which also properly locates the outlets 94 and 96 of each receptacle 52a and 52b relative to the cover 58 of the control panel assembly 40 when assembly is completed.

Each duplex receptacle 52a and 52b has a plurality of pairs, i.e., at least three, of terminal blades 110, 112, 114 and/or 116 with at least one of the terminal blades being a neutral or positive terminal blade, at least one of the other terminal blades 110, 112 and/or 114 being a hot or negative terminal blade, and at least one of the terminal blades, namely terminal blade 116, being a ground terminal blade. As is shown in FIG. 5, each duplex receptacle 52a and 52b has at least one pair of generally parallel opposed terminal blades 110 and 114 but can have a plurality of pairs of generally parallel and opposed terminal blades 110 and 114 and 112 and 113 if each receptacle 52a and 52b is configured with an additional terminal blade 113, such as shown in phantom in FIG. 6.

At least one of the terminal blades, namely terminal blade 116, is asymmetric relative to at least one of the other terminal blades 110, 112 and/or 114 and/or the receptacle base 90 to properly locate each receptacle 52a and 52b when plugged into its corresponding socket 46a and/or 46b. In the preferred duplex receptacle embodiments shown in FIGS. 3-6, there is at least one pair of generally parallel hot and/or neutral terminal blades 114 and 110 and/or 114 and 112 with the ground terminal blade 116 being offset from them and disposed adjacent one end of the receptacle base 90 with the offset providing asymmetry ensuring proper location by ensuring that the receptacle 52a and 52b can only be plugged in one way into sockets 46a and/or 46b. In such a duplex receptacle embodiment, the ground terminal blade 116 can also be oriented at an angle, e.g., an oblique angle, relative to the hot and neutral terminal blades 110, 112 and 114 such that the angular offset provided by the ground terminal blade 116 also provides asymmetry relative to the other terminal blades that ensures proper location and orientation of the receptacle 52a and 52b when plugged into a corresponding socket 46a and/or 46b.

FIGS. 14 and 15 illustrate another preferred embodiment of a duplex receptacle 52' with which an electrical component mounting board 44 constructed in accordance with the present invention can be configured to receive. Receptacle 52' can be constructed substantially the same as receptacles 52a and 52b having a generally rectangular box-like base 90 to which an outlet plate 92 is attached forming a receptacle housing in which power plug prong engaging contacts are disposed but employing a terminal blade configuration that can differ as discussed in more detail below. The receptacle outlets 94 and 96 are integrally formed portions of the outlet plate 92 that can be upraised as shown in FIG. 14 and interconnected by a recessed bridge 99 which includes a threaded bore 101 for receiving a threaded fastener, e.g., screw or bolt, typically used to attach an outlet wall plate (not shown). A mounting strap 103 can be included that has mounts 105 and 107 at opposite receptacle ends typically used with fasteners (not shown) to attach the receptacle 52' to an electrical box (not shown).

As is best shown in FIG. 15, receptacle 52' has a plurality of pairs of terminal blades 110, 112, 113 and 114 that extend outwardly from the receptacle base 90 with terminal blades 110 and 112 on one side each respectively connected by terminal screws 111 and 115 and terminal blades 113 and 114 on an opposite side respectively connected by terminal screws 117 and 119 to corresponding plug prong engaging contacts within the receptacle. While receptacle 52' also has four terminal blades, receptacle 52' differs from receptacles 52a and 52b in that receptacle 52' lacks a ground terminal blade 116 attached adjacent one end as shown in the receptacles 52a and 52b depicted FIG. 6 but can be equipped with a ground terminal blade 116 if desired.

Each terminal blade 110, 112, 113, 114 and 116 can be elongate, can have a generally rectangular cross-section, and is made of an electrically conductive material, such as copper, aluminum, steel, silver, a silver coating, gold, a gold coating, or another electrically conductive material. Each terminal blade 110, 112, 113, 114 and 116 is carried by the receptacle base 90 and can extend outwardly beyond an end wall 91 of the base 90. In a preferred embodiment, each terminal blade 110, 112, 113, 114 and 116 is assembled or mounted to the duplex receptacle 52a and 52b, such as discussed in more detail in the following paragraph, with each terminal blade being elongate having a width of about 0.03 inches and a width of about one-quarter inch.

FIG. 16 depicts a preferred embodiment of a terminal blade 114 that has an elongate generally planar blade body 121 with a terminal spade 123 at one end and a head 125 at its opposite end with a hole 127 in it through which the stem of terminal screw 119 extends when mounting the terminal blade 114 to the receptacle 52' and/or 52a and 52b. Where it is desired to include a ground terminal blade 116, the ground terminal blade 116 can be constructed the same as terminal blade 114 receiving a terminal screw used to attach the terminal blade 116 to a ground tab 131 of the receptacle. In another embodiment, the base 90 of the receptacle 52c is integrally formed, such as by molding, such that each terminal blade 110, 112, 113 and 114 is molded in place into the receptacle base 90. In still another embodiment, each terminal blade 110, 112, 113 and 114 can be configured to snap or clip onto a corresponding terminal screw 111, 115, 117 and 119.

In a preferred embodiment, each duplex receptacle 52a and 52b is configured with only three terminal blades having (a) one terminal blade, such as terminal blade 110 or 112, connected to neutral, (b) one terminal blade, such as terminal blade 113 or 114, connected to hot, and (c) one terminal blade 116 connected to ground with one terminal blade 116 asymmetric in spacing or angular orientation relative to the neutral and hot terminal blades to ensure the duplex receptacle 52a and 52b can only be plugged into its respective socket 46a and 46b only one way. Such a terminal blade configuration not only ensures proper duplex receptacle location when plugged into socket 46a and/or 46b, it also properly locates the receptacle 52a and 52b in a manner that also advantageously ensures proper outlet polarity.

With reference to FIGS. 6-11, the plug-in duplex sockets 46a and 46b integrally formed in the board 44 have a plurality of contact-receiving openings that are substantially straight terminal blade receiving slots 118, 120, 122, and 136 formed in the cover-facing side 74 of the outer housing 82. As is best illustrated by FIG. 7, each one of the terminal blade receiving slots 118, 120, 122 and 136 formed in the cover-facing half 84 of the board housing 82 lies in registry with a corresponding electrical contact 124, 126, 128 and 138 of a duplex receptacle female plug contact arrangement 130 with each contact 124, 126, 128 and 138 extending outwardly from the electrically conductive inner layer 88. Where a duplex receptacle 52' is equipped with a fourth hot/neutral terminal blade 113, each receptacle socket 46a and 46b can be modified to include an additional terminal blade receiving slot parallel and opposite to slot 118 having an electrical contact disposed within the board 44 in registry with the slot.

With continued reference to FIG. 7, at least one of the contacts 124, 126 and/or 128 is a neutral or positive contact connected to neutral, at least one of the other contacts 124, 126 and/or 128 is a hot or negative contact connected to the hot side, and contact 138 is a ground contact. In a preferred duplex plug socket contact arrangement, at least one of the contacts 124 and 126 is a hot contact, at least one of the contacts, namely contact 128, is a neutral contact and at least one of the contacts, contact 138, is a ground contact.

Each electrical contact 124, 126, 128 and 138 is of terminal-blade engaging construction having a pair of opposed contact leafs 132 and 134 disposed within the housing 84 that both extend outwardly from the electrically conductive inner layer 88 of the board 44 toward the cover-facing half 84 of the housing 82 in line with and underlying a corresponding one of the terminal-blade receiving slots 118, 120 and 122. Each pair of opposed contact leafs 132 and 134 are spring biased into contact with each other separating to allow insertion of a terminal blade 110, 112, or 114 of one of the duplex receptacles 52a or 52b being plugged into the socket 46a or 46b with the contact leafs 132 and 134 respectively making contact with opposite sides of the inserted terminal blade.

To facilitate plugging in of each duplex receptacle 52a and 52b into its corresponding socket 46a and 46b, the cover-facing side 74 of the board housing 82 includes a pair of integrally formed duplex receptacle seats 140 defined by a flat 142 against which the bottom 91 of each receptacle 52a and 52b abuts and a plurality of curved seating ribs 144, 146 and 148 that help locate the receptacle as it is being plugged into the board 44. The seating ribs 144, 146 and 148 bracket a plurality of corners of the duplex receptacle 52a and/or 52b being plugged in which each rib 144, 146 and 148 complementarily curved to substantially conform to the corner of the receptacle 52a and/or 52b disposed adjacent the rib helping support the receptacle after being plugged in by helping prevent lateral and/or twisting receptacle motion during control panel use and operation. In a preferred embodiment, each duplex receptacle seat 140 has at least a pair of upraised locator ribs 144 and 148 that bracket diagonally opposite corners of a duplex receptacle 52a and/or 52b plugged into one of the sockets 46a and/or 46b. In another embodiment, the seat 140 has at least three such ribs 144, 146 and 148 bracketing at least three corners of a duplex receptacle 52a and/or 52b plugged into one of the sockets 46a and/or 46b.

Figure 8:
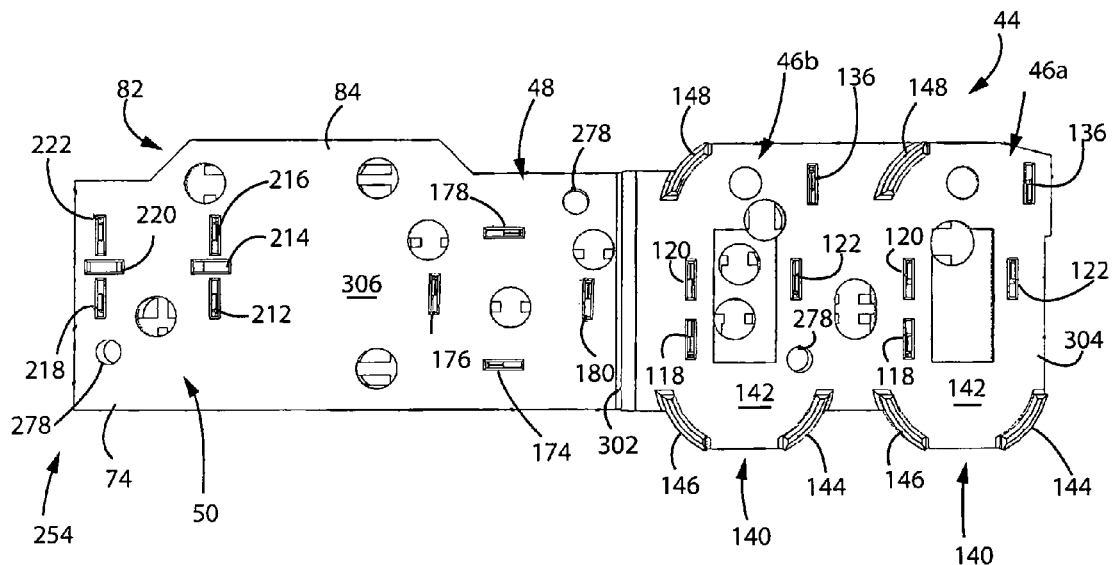
FIG. 8 is a top plan view of the electrical component mounting board.

As is best shown in FIG. 8, at least one pair of the socket slots 120 and 122 of each duplex socket 46a and 46b are generally opposed and parallel with at least one of the socket slots 136 being asymmetric by being offset by being spaced outboard of the adjacent slot 122 of the pair of generally opposed and parallel slots 120 and 122 to properly locate a duplex receptacle 52a and 52b respectively plugged into socket 46a and 46b. In a preferred duplex socket embodiment, each socket 46a and 46b asymmetrically offsets a locator socket slot 136 relative to the hot and neutral socket slots 118, 120 and 122 such that the locator socket slot 136 lies transversely and longitudinally outboard of the hot and neutral socket slots 118, 120 and 122 relative to the transverse and longitudinal extent of a duplex receptacle 52a and 52b plugged into the socket 46a and 46b ensuring that the receptacle 52a and 52b can only be plugged in one way.

With reference to FIGS. 5-11, the 120/240 volt receptacle 54 can be a twist lock receptacle having a twist lock outlet 150 carried by a receptacle base 152 with the outlet 150 having a plurality of pairs, i.e., at least three, of prong or blade receiving slots 154, 156, 158 and 160 arranged in a circle about a center ground prong receiving opening 162. As is best shown in FIG. 6, each one of the prong or blade receiving slots 154, 156, 158 and 160 are curved and in line with a prong or blade engaging contact (not shown) underlying the outlet 150 disposed within the base 152. In a preferred contact and slot arrangement, the contacts in line with a plurality of the slots 154 and 158 are hot, the contact in line with slot 156 is connected to neutral, and the contact in line with slot 160 is connected to ground. When providing three phase current, e.g., 220-240 volt three phase alternating current, the contacts in line with slots 154, 156 and 158 each carry a different phase with the contact in line with slot 160 being connected to ground.

As is best shown in FIG. 5, the 120/240 volt receptacle 54 has a plurality of electrically conductive terminal blades 164, 166, 168 and 170 extending outwardly from a bottom 172 of the receptacle base 152. As is also depicted in FIG. 5, the terminal blades 164, 166, 168 and 170 can be configured in a first pair of generally parallel terminal blades 164 and 168 and a second pair of terminal blades 166 and 170 such that the terminal blades 164, 166, 168 and 170 are arranged in a generally square configuration. In one terminal blade arrangement, a plurality of the terminal blades 164, 166, 168 and 170 are hot, one of the terminal blades 164, 166, 168 and 170 is connected to neutral, and one of the terminal blades 164, 166, 168 and 170 is connected to ground when the receptacle 54 is plugged into its socket 48 in the board 44. In such a terminal arrangement, the terminal blades 164, 166, 168 and 170 connected to hot and neutral also carry a separate current phase enabling the 120/240 volt receptacle to deliver either 120 volts alternating current or 240 volts alternating current depending on what prongs or blades of a twist lock plug (not shown) plugged into the outlet 150 are active, wired or connected. In one preferred terminal blade arrangement, terminal blades 164 and 168 are both connected to hot but connected to different current phases, terminal blade 166 is connected to neutral and connected to a third current phase, and terminal blade 170 is connected to ground.

With reference once again to FIGS. 6-11, the 120/240 volt receptacle socket 48 has a plurality of pairs of substantially straight terminal-receiving slots 174, 176, 178 and 180 formed in the cover-facing side 74 of the outer housing 82. As is best illustrated by FIG. 7, each one of the terminal-receiving slots 174, 176, 178 and 180 formed in the cover-facing half 84 of the board housing 82 lies in registry with a corresponding electrical contact 182, 184, 186 and 188 of a 120/240 volt receptacle female plug contact arrangement 190 with each contact 182, 184, 186 and 188 extending outwardly from the electrically conductive inner layer 88.

As with the duplex receptacle contacts 124-128, each 120/240 volt receptacle contact 182, 184, 186 and 188 is of terminal blade engaging construction having a pair of opposed contact leafs 132 and 134 spring biased against one another that is separated when one of the terminal blades 164, 166, 168 and 170 of the 120/240 volt receptacle 54 is inserted when the receptacle 54 is plugged into the board 44. In a preferred 120/240 volt receptacle contact arrangement 190, a plurality of the terminal blade engaging contacts 182, 184, 186 and 188 provides a hot connection, one of the terminal blade engaging contacts 182, 184, 186 and 188 provides a neutral connection, and one of the terminal blade engaging contacts 182, 184, 186 and 188 provides a ground connection.

In such a terminal arrangement, the terminal blade engaging contacts 182, 184, 186 and 188 connected to hot and neutral also carry a separate current phase enabling the 120/240 volt receptacle to deliver either 120 volts alternating current or 240 volts alternating current depending on what prongs or blades of a twist lock plug (not shown) plugged into the outlet 150 are active, wired or connected. In one preferred terminal blade engaging contact arrangement 190, contacts 182 and 186 are hot but connected to different current phases, contact 184 provides a neutral connection that also delivers a third current phase, and contact 188 provides a ground connection.

With reference once again to FIGS. 5-11, the circuit breaker 56 has a housing 192 with a cover plate 194 having a circuit breaker reset switch 196 with two generally parallel pairs of aligned electrically conductive generally straight terminal blades 198 and 202 and 204 and 208 having a transversely extending locator tab 200 and 206 respectively disposed between each aligned tab pair 198, 202 and 204, 208 in an H configuration extending outwardly from a bottom 210 of the circuit breaker housing 192. Each locator tab 200 and 206 is made of an electrically insulating material, such as plastic, and can be integrally formed of part of the circuit breaker housing 192 if desired.

With specific reference to FIGS. 6-11, the circuit breaker socket 50 is integrally formed in the board 44 and has a plurality of pairs of slots 212, 214, 216, 218, 220, and 222 formed in the cover-facing side 74 of the board 44 arranged in an H configuration with slots 212, 216, 218 and 222 respectively overlying a corresponding terminal blade receiving contact 224, 226, 228, and 230 extending outwardly from the electrically conductive inner layer 88 within the board 44. Each one of the terminal blade receiving contacts 224, 226, 228, and 230 is of terminal blade engaging construction having a pair of opposed contact leafs 132 and 134 spring biased against one another that each become slightly separated when a corresponding one of the terminal blades 198, 202, 204, and 208 of the circuit breaker 56 are inserted when the breaker 56 is plugged into the board 44.

The H configuration of the circuit breaker socket slots 212, 214, 216, 218, 220, and 222 of socket 50 and the H configuration formed by the terminal blades 198, 202, 204 and 209 and locator tabs 200 and 206 of the circuit breaker 56 ensure proper location of the circuit breaker 56 when the circuit breaker 56 is plugged into its socket 50 in the board 44. Such an H-configuration circuit breaker locator arrangement ensures that the circuit breaker 56 can only be plugged into the board 44 in a manner where it is both properly located (a) electrically relative to contacts 224, 226, 228, and 230 and (b) physically relative to its access opening 66 in the cover 58.

As is discussed in more detail below, the electrical component mounting board 44 also includes a socket 76 on the opposite enclosure-facing side 78 formed by a plurality of pairs of terminal blade engaging contacts 232, 234, 236, 238 and 240 that extend outwardly from the inner electrically conductive layer 88 through corresponding openings 242, 244, 246, 248 and 250 formed in the enclosure-facing half 86 of the board 44. As is depicted in FIG. 4, each terminal blade engaging contact 232, 234, 236, 238 and 240 is formed of a pair of opposed contact leafs 132 and 134 spring biased against one another that is separated when one of the terminal blades of a five bladed or five pronged plug is plugged into the backside of the board 44 when assembling the control panel module 72 to an apparatus, such as a generator, welder or the like.

The electrically conductive layer 88 can be formed by stamping a relatively thin, generally planar sheet 129 made of an electrically conductive material, such as copper, aluminum or another suitable electrically conductive material, with each one of its outwardly extending contacts 124, 126, 128, 138, 182, 184, 186, 188, 224, 226, 228, 230, 232, 234, 236, 238 and 240 integrally formed of the sheet 129 during stamping thereby forming an electrically conductive spider 252 having a first plurality of electrical socket contacts 124, 126, 128, 138, 182, 184, 186, 188, 224, 226, 228, and 230 extending outwardly in one direction and a second plurality of electrical socket contacts 232, 234, 236, 238 and 240 extending outwardly in an opposite direction.

The board housing 84 is made of an electrical insulator, such as a plastic, and can be formed around the spider 252, such as by molding or the like, to produce an insert molded circuit board 254 having a plurality of sockets 46a, 46b, 48 and 50 on one side 74 of the circuit board 254 and at least one socket 76 on the opposite side 78 of the circuit board 254. In another preferred embodiment, the housing 84 can be formed of two halves 84 and 86 made of an electrically insulating material that is joined together around the spider 252 in any suitable manner including by using an adhesive, ultrasonic welding, radio frequency bonding, heat sealing, or the like.

Although not shown in the drawings, the electrically conductive spider 252 is an electrically conductive sheet that preferably is stamped not only to integrally form the electrical contacts 124, 126, 128, 138, 182, 184, 186, 188, 224, 226, 228, 230, 232, 234, 236, 238 and 240 but also to integrally form electrically conductive leads, circuit branches and/or circuit lines extending between the contacts 124, 126, 128, 138, 182, 184, 186, 188, 224, 226, 228, 230, 232, 234, 236, 238 and 240 that direct electron flow during control panel module operation to the proper electrical contacts and terminal blades of the electrical components 52a, 52b, 54 and 56 plugged into the board 44. Where insert molded, electrical insulating material of the board housing 84 can and preferably does at least slightly separates the leads, branches and/or lines extending between the contacts 124, 126, 128, 138, 182, 184, 186, 188, 224, 226, 228, 230, 232, 234, 236, 238 and 240 of the spider 252 such that electrically insulating material remains between the leads, branches and/or lines after forming of the circuit board 254 is complete thereby electrically insulating adjacent leads, branches and/or lines from each other.

Figure 12:
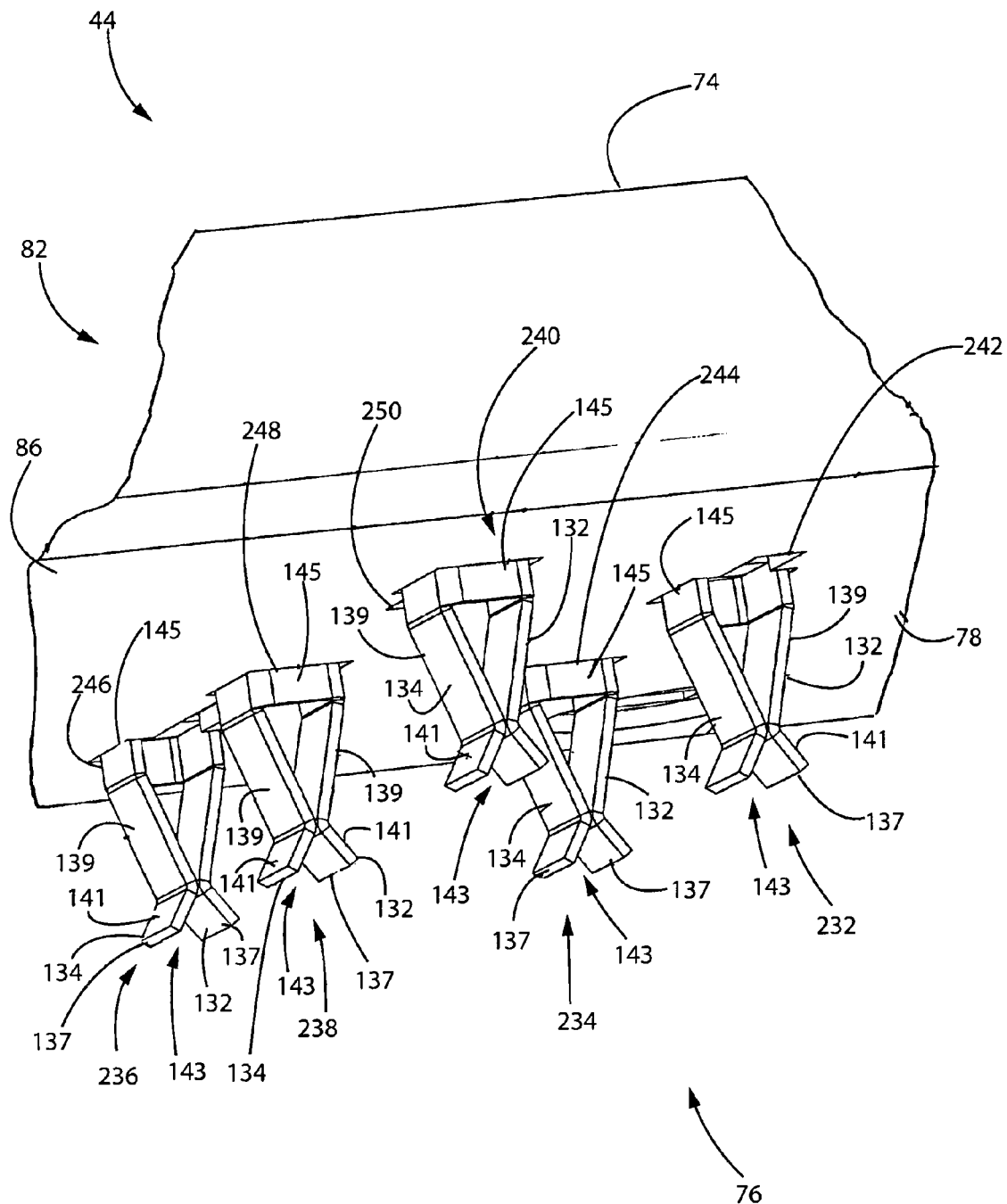
FIG. 12 is an enlarged fragmentary perspective view of part of the electrical component mounting board illustrating blade receiving contacts of a socket of the board.

FIG. 12 illustrates the terminal blade engaging contacts 232, 234, 236, 238 and 240 of the control panel plug in socket 76 in more detail. Each contact 232, 234, 236, 238 and 240 includes a pair of contact leafs 132 and 134 spring biased into engagement with one another. Each contact leaf 132 and 134 is formed of an elongate contact finger 137 having a first converging contact segment 139 disposed at a converging oblique angle toward the first segment 139 of the other contact having a length sufficient so the opposed contact leafs 132 and 134 engage one another. The contact finger 137 of each contact leaf 132 and 134 includes a second diverging contact leaf segment 141 that is disposed at an opposite oblique angle relative to the first converging contact leaf segment 139 such that the diverging contact segments 141 of both contact leafs 132 and 134 form a generally V-shaped terminal blade receiving mouth 143 that guides a terminal blade of a plug or electrical component between the contact leafs 132 and 134 during insertion forming a generally X-shaped contact arrangement.

Figure 9:
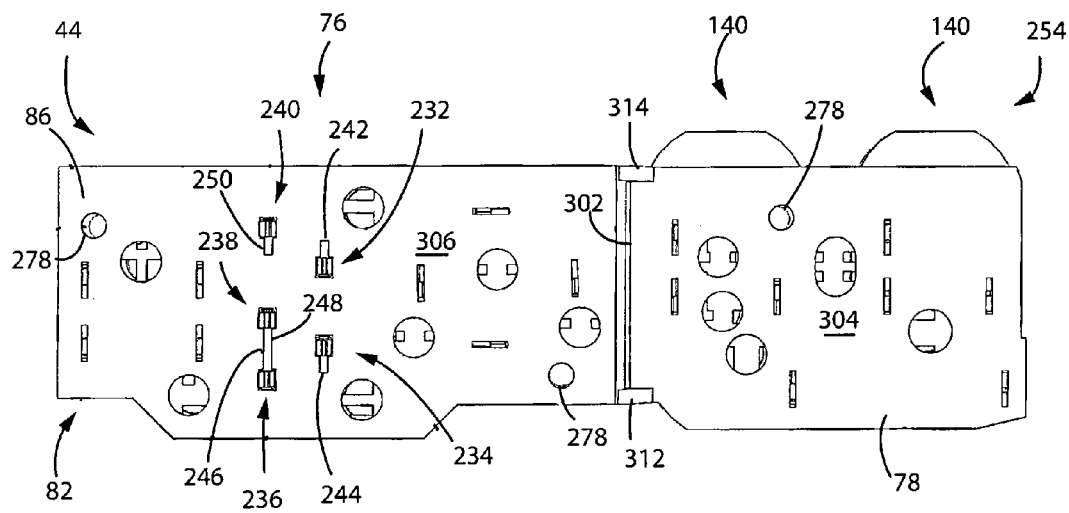
FIG. 9 is a bottom plan view of the electrical component mounting board.

The finger 137 of each contact leaf 132 and 134 extends outwardly from a generally U-shaped contact base 145 integrally formed during stamping of the electrically conductive sheet 129 in making the spider 252 (FIG. 7) that structurally rigidifies each contact 124, 126, 128, 138, 182, 184, 186, 188, 224, 226, 228, 230, 232, 234, 236, 238 and 240. The generally U-shaped contact base 145 of at least the contacts 232, 234, 236, 238 and 240 of the control panel plug in socket 76 seats in a corresponding one of the contact locator openings 242, 244, 246, 248 and 250 formed in the electrically insulating housing 82 that encases the spider 252 during making of the electrical component mounting board 44. For example, as best shown in FIGS. 9 and 12, the bottom half 86 of the housing 82 enclosing or encasing the spider 252 has generally slot-shaped contact base locator openings 242, 244, 246, 248 and 250 in which the generally U-shaped contact base 145 of contacts 242, 244, 246, 248 and 250 respectively seat.

Figure 13:
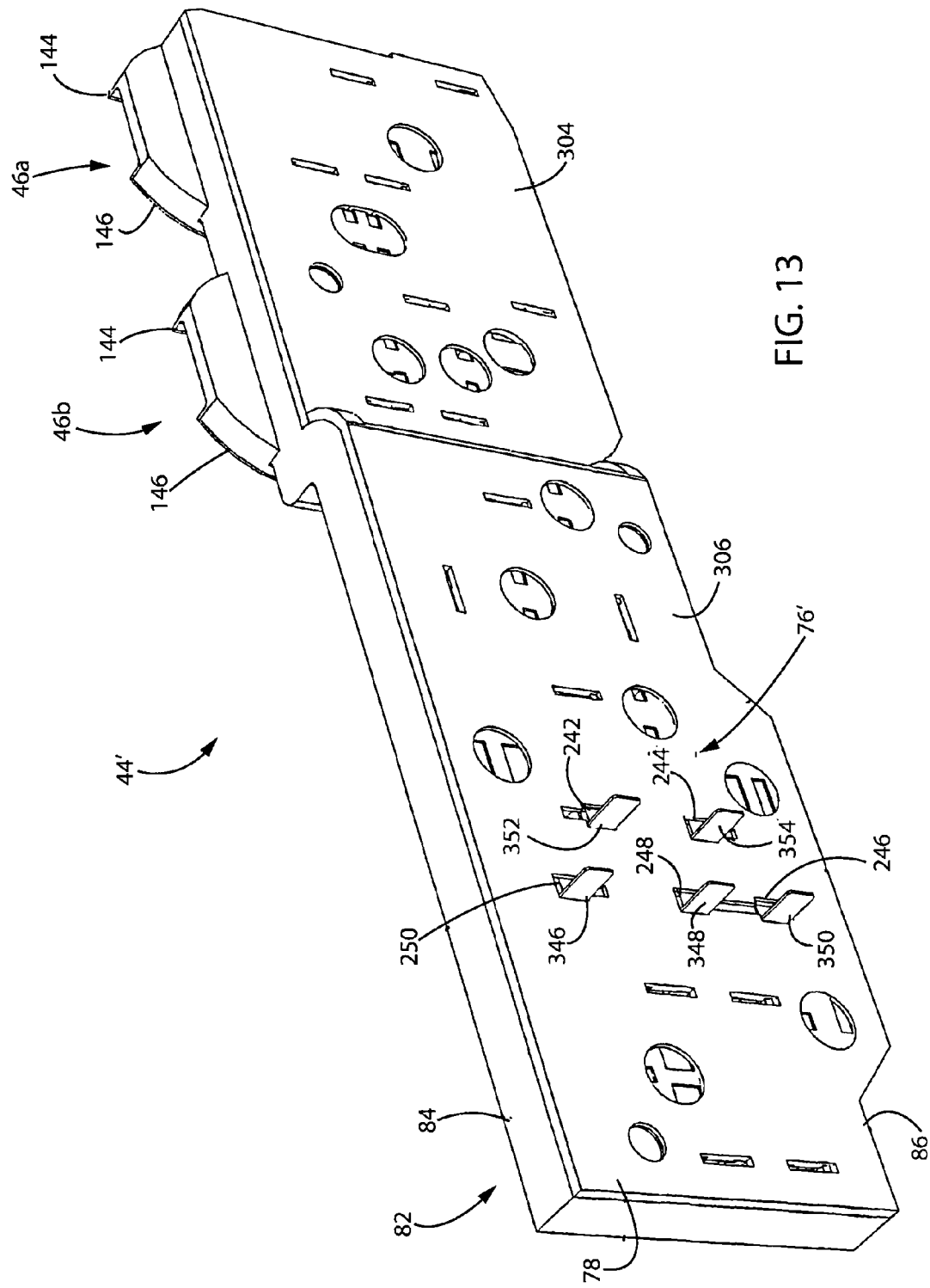
FIG. 13 is a perspective bottom view of another preferred embodiment of an electronic component mounting board having a socket formed of outwardly extending male spade or blade type terminals.

FIG. 13 illustrates another preferred embodiment of an electrical component mounting board 44' constructed in accordance with the present invention having a plurality of pairs of outwardly extending terminal blades 346, 348, 350, 352 and 354 defining a control panel module connector socket 76' configured for receiving a female plug having a corresponding number of generally slot-shaped openings that each respectively receive one of the terminal blades 346, 348, 350, 352 and 354 when the plug is plugged into the socket 76'. Each terminal blade 346, 348, 350, 352, and 354 is integrally formed of the electrically sheet 129 when stamped to form the spider 252 before being encased in housing 82. Each electrically conductive metallic terminal blade 346, 348, 350, 352, and 354 is elongate, generally planar, generally rectangular, and can have the same dimensions as the terminal blades, e.g., terminal blades 110, 112, 114 and/or 116, extending outwardly from the duplex receptacles 52a and 52b.

As is also shown in FIG. 13, each plug in socket terminal blade 346, 348, 350, 352, and 354 of socket 76' respectively extends outwardly through a corresponding one of slots 242, 244, 246, 248, and 250 formed in the bottom half 86 of the board housing 82. Each terminal blade 346, 348, 350, 352, and 354 extends outwardly of the housing 82 a sufficient distance so it can be received in a corresponding slot in a female plug that is plugged into the socket 76' in the rear of the control panel module 72.

If desired, one or more of the female electrical component plug in sockets 46a, 46b, 48 and/or 50 integrally formed in the board 44 or 44' can also be formed of outwardly extending terminal blades like those of the male control panel module connector socket 76' to produce a male electrical component receiving socket. As with the terminal blades 346, 348, 350, 352, and 354 that form male socket 76', the terminal blades of each such integrally formed male electrical component receiving socket would be integrally formed of the spider 252 and would extend outwardly from one or more of the slots that define the socket 46a, 46b, 48, and/or 50 with each male terminal blade being respectively received in a slot formed in a corresponding one of the electrical components.

Figure 17:
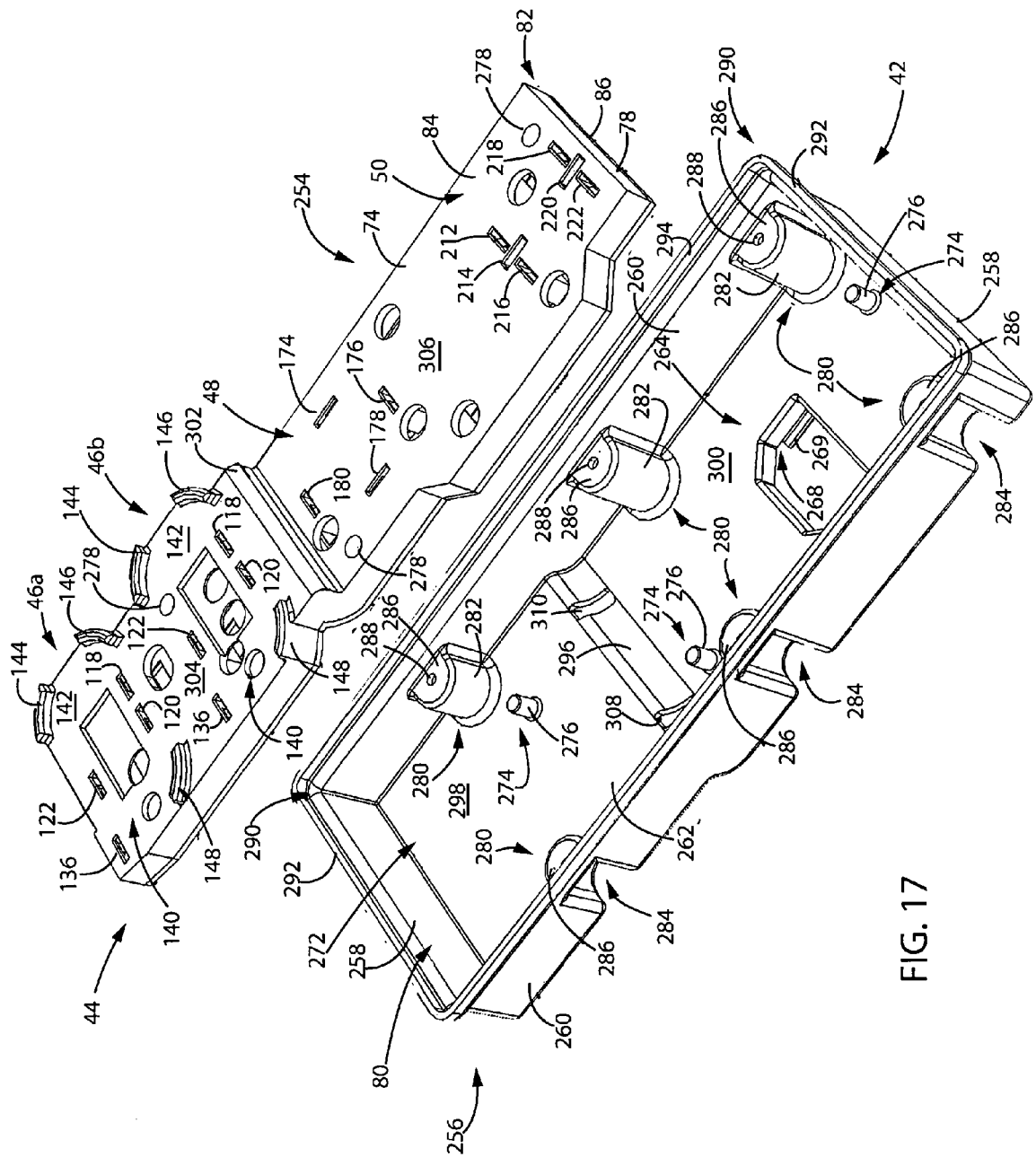
FIG. 17 is an exploded top perspective view of the electrical component mounting board and control panel enclosure illustrating insertion of the board into the enclosure during control panel assembly.
Figure 18:
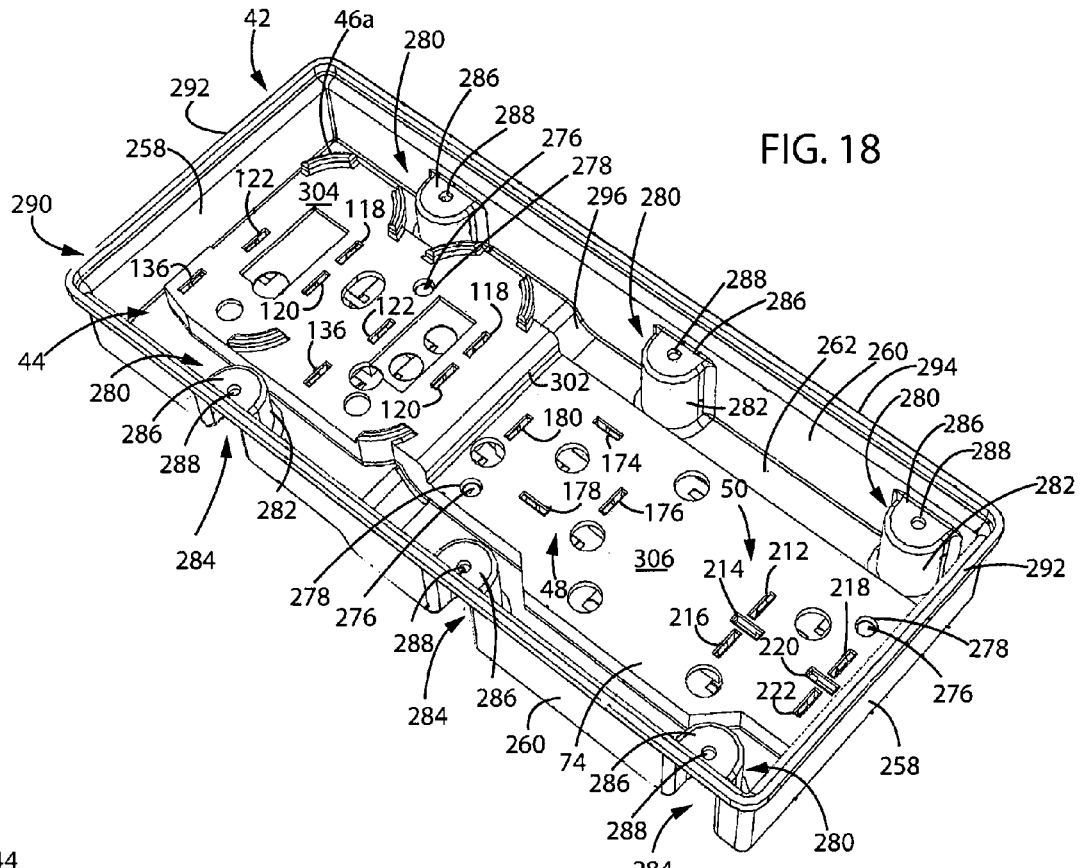
FIG. 18 is a top perspective view of the electrical component mounting board seated in the control panel enclosure.
Figure 19:
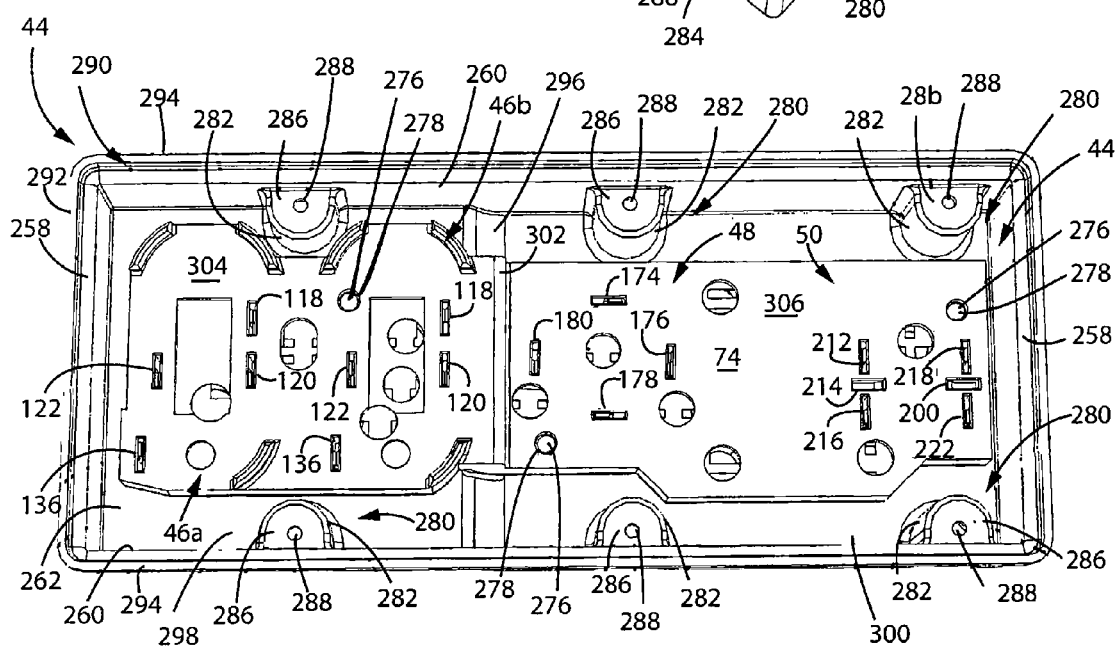
FIG. 19 is a top plan view of the electrical component mounting board seated in the control panel enclosure.

With additional reference to FIGS. 17-19, the control panel assembly 40 is constructed and arranged to enable the board 44 to be inserted into the enclosure cavity 80 in assembling the board 44 to the enclosure 42 without using any fasteners to attach the board 44 to the enclosure 42. The enclosure 42 is a generally rectangular box 256 having two pairs of opposed and generally parallel sidewalls 258 and 260 extending outwardly from a bottom wall 262 that is disposed opposite the control panel cover 58 when the cover 58 is attached. As best shown in FIG. 4, the bottom wall 262 has a socket opening 264 disposed in line with the control panel socket 76 with the opening 264 bounded by an electrical connector seating lip 266 that has a pair of opposed outwardly extending connector engaging latch fingers 268 with snaps 269 that each define a plug engaging latch 271 with the lip 266, fingers 268 and snaps 269 forming an electrical connector coupling 270 configured to releasably engage a male electrical connector (not shown) that enables releasable connection of the control panel module 72 to an electrical cable or a part of an apparatus. In the preferred socket embodiment shown in FIG. 4, the plug seating lip 266 is six sided defining a six sided socket opening 264 having a hexagonal shape that can be a cyclic hexagon such as a Lemoine hexagon configured to receive a similarly shaped or configured plug when inserted into the socket 76.

With continued reference to FIGS. 17-19, the enclosure 42 is three dimensionally configured to provide an electric component mounting board seating arrangement 272 that helps locate and securely seat the board 44 when the board 44 is being inserted into the enclosure cavity 80 during assembly. The seating arrangement 272 includes a plurality of spaced apart locators 274 that are pins 276 that extend outwardly from the bottom wall 262 that are each received in a corresponding locator bore 278 in the board 44 when the board 44 is inserted into the enclosure cavity 80.

The board seating arrangement 272 can further include a plurality of board bracketing seats 280 disposed along opposite side edges of the board 44 seated in the enclosure 42. The board bracketing seats 280 are formed by interiorly disposed generally U-shaped sidewalls 282 integrally formed in opposing enclosure sidewalls 258 that define tool access channels 284 each in communication with a mounting tab 286 having a fastener receiving bore 288 formed therein disposed adjacent a generally L-shaped cover seat 290 extending along outer edges 292 and 294 of the enclosure sidewalls 258 and 260. Each tool access channel 284 enables insertion of a tool (not shown), such as a screwdriver, in order to engage a fastener 60 to drive the fastener 60 through the bore 288 in the mounting tab 286 into engagement with the cover 58 during attachment of the cover 58.

The board seating arrangement 272 can also further include mating or registry between an offset 296 in the enclosure bottom wall 262 dividing the enclosure bottom into a plurality of wall sections 298 and 300 having different elevations and an offset 302 in the board 44 dividing the board 44 into two different board sections 304 and 306 having different elevations to accommodate electrical components 52a, 52b, 54 and 56 plugged into the board 44 having different heights. As is best shown in FIGS. 3-6 and 16, the board 44 is divided into two generally planar board sections 304 and 306 with the board section 304 into which the shorter duplex receptacles 52a and 52b are plugged having a first elevation above the other board section 306 into which the taller 120/240 volt receptacle 54 and circuit breaker 56 are plugged. As is best shown in FIGS. 3, 4 and 16, the enclosure bottom wall 262 is divided into two generally planar bottom wall sections 298 and 300 that are generally parallel to the control panel cover 58 when the cover 58 is attached to the enclosure 44 with wall section 298 located closer to the cover 58 than wall section 300.

When the board 44 is inserted into the enclosure 42 during assembly, the offset 302 of the board 44 extends transversely the width of the board 44 overlying the transversely widthwise extending offset 296 in the enclosure bottom wall 262 helping to not only properly locate the board 44 within the enclosure 42, but the offsets 296 and 302 also register or mate in a manner providing support to the board 44 helping to prevent movement of the board 44 relative to the enclosure 42 in a lengthwise or longitudinal direction of the board 44. If desired, the bottom wall offset 296 can include a pair of integrally formed spaced apart locator recesses 308 and 310 that respectively receive a locator ribs 312 and 314 integrally formed in the board offset 302 that helps more securely seat the board 44 in the enclosure 42 during assembly without using any fastener to attach the board 44 to the enclosure 42.

Such a board seating arrangement 272 advantageously facilitates simple and quick installation of board 44 in an enclosure 42 that can be done in at least one embodiment without using any fasteners to attach the board 44 to the enclosure 42. The locator pins 276 of the enclosure 42 received in their corresponding locator bores 278 formed in the board 44 not only ensure that the board 44 is accurately located relative to the enclosure 42, the pins 276 help minimize movement of the board 44 relative to the enclosure 42 after being assembled in the enclosure 42. The board bracketing locators 280 formed by the tool access channel defining sidewalls 282 disposed within the enclosure cavity 80 help prevent lateral movement of the board 44 relative to the enclosure 42 after being assembled in the enclosure 42. The mating offsets 296 and 302 help prevent longitudinal movement of the board 44 relative to the enclosure 42 after being assembled in the enclosure 42.

Figure 20:
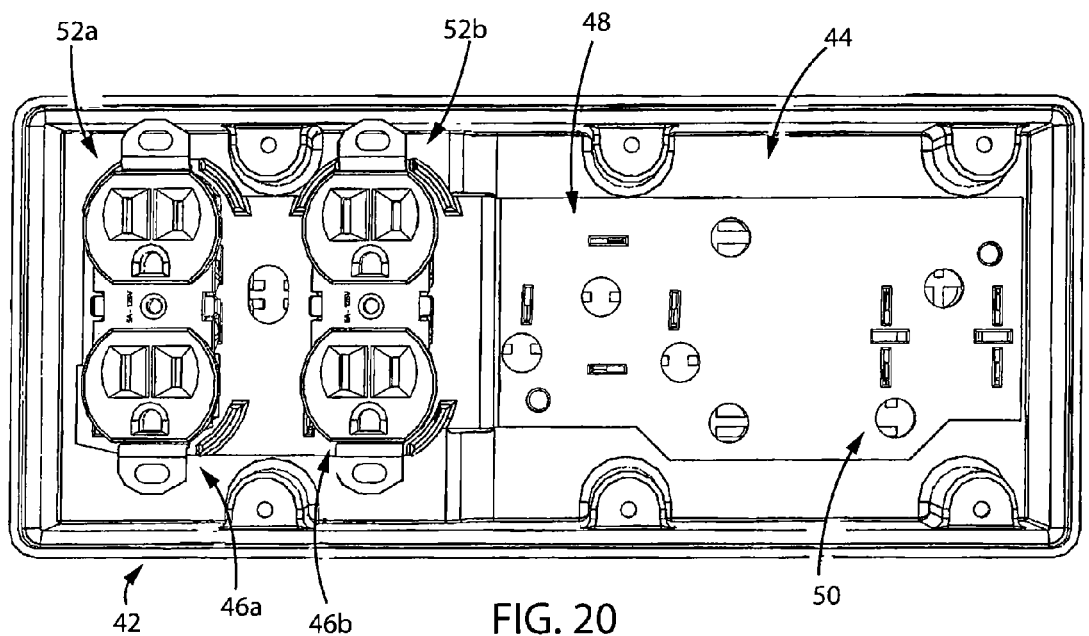
FIG. 20 is a top plan of the electrical component mounting board seated in the control panel enclosure having a plurality of duplex receptacles plugged into the board during control panel assembly.
Figure 21:
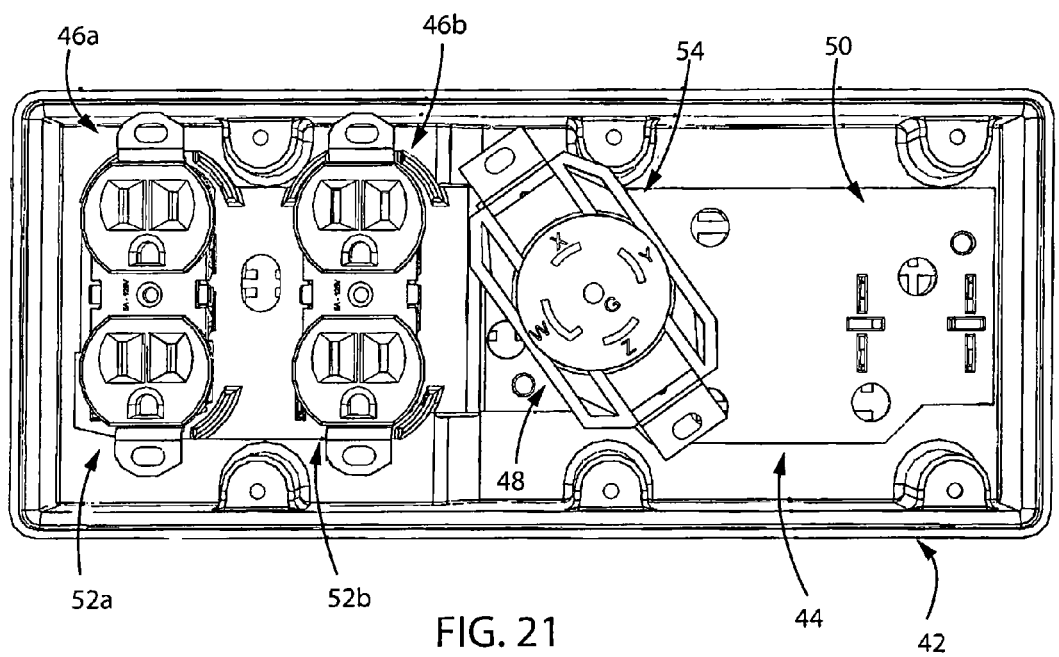
FIG. 21 is a top plan of the electrical component mounting board seated in the control panel enclosure illustrating another power receptacle plugged into the board during control panel assembly.
Figure 22:
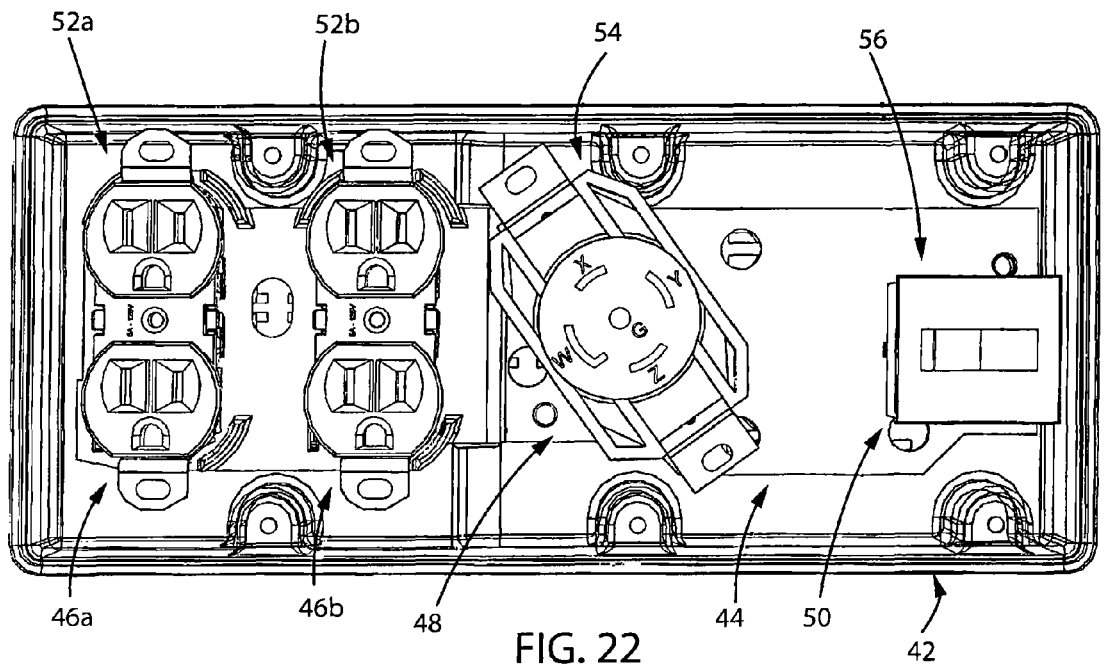
FIG. 22 is a top plan view is a top plan of the electrical component mounting board seated in the control panel enclosure illustrating a circuit breaker plugged into the board during control panel assembly.

With reference to FIGS. 17-24, in assembly, the board 44 is seated in the enclosure 42 as discussed above without the use of any fasteners attaching the board 44 to the enclosure 42. With reference to FIGS. 20-22, each one of the receptacles 52a, 52b, 54 and 56 are plugged into their respective sockets 46a, 46b, 48 and 50 integrally formed in the board 44 after that board 44 has been seated in the enclosure 42. If desired, a method of control panel assembly in accordance with the present invention also contemplates plugging the receptacles 52a, 52b, 54 and 56 into the board 44 before assembling the board 44 to the enclosure 42.

FIG. 20 depicts plugging the duplex receptacles 52a and 52b into the board 44 first after the board 44 has been seated in the enclosure 42. FIG. 21 illustrates plugging the 120/240 volt receptacle 54 into the board 44 after the duplex receptacles 52a and 52b have been plugged in and FIG. 22 depicts plugging the circuit breaker 56 into the board 44 after all of the power receptacles 52a, 52b and 54 have been plugged in. While FIGS. 20-22 illustrate one preferred order of plugging the electrical components 52a, 52b, 54 and 56 into the board 44 seated in the enclosure 42, a method of control panel assembly in accordance with the present invention contemplates plugging either the 120/240 volt receptacle 54 and/or the circuit breaker 56 into the board 44 before plugging in the duplex receptacles 52a and 52b.

Figure 23:
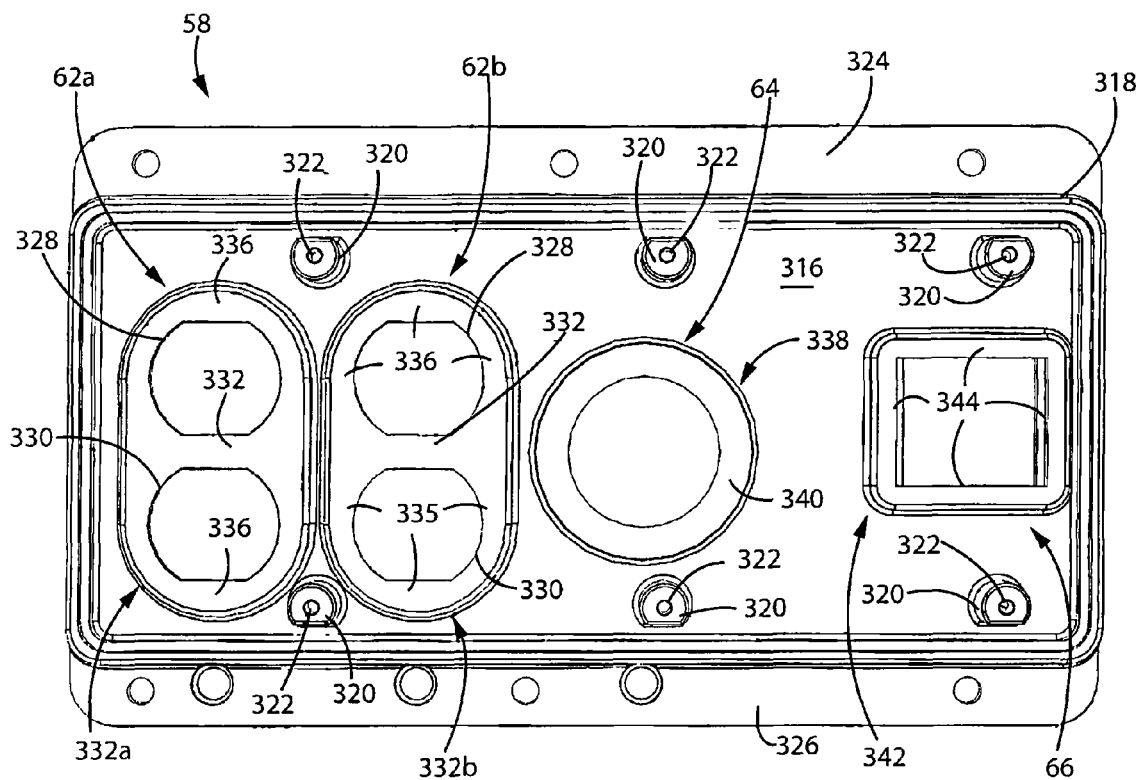
FIG. 23 is a rear plan view of the control panel cover depicting electrical component abutment seats that abut against respective electrical components plugged into the board when the cover is attached to the enclosure.

FIG. 23 illustrates a rear face 316 of the control panel cover 58 before attachment to the enclosure 42. The rear cover face 316 includes a cover seating rib 318 that extends substantially about the periphery of the cover 58 that is received in the cover seat 290 formed in the outer edges 292 and 294 of the enclosure side walls 258 and 260 during attachment of the cover 58 to the enclosure 42. Inboard of the cover seating rib 318 are a plurality of pairs of opposed mounting posts 320 that extend outwardly from the rear cover face 316 that can each include a fastener receiving bore 322 for threadably receiving one of the fasteners 60 during cover attachment. The cover 58 can have one or more mounting flanges 324 and 326 outboard of the cover seating rib 318 to facilitate attachment to an apparatus or other piece of equipment, e.g., generator, welder, etc., such as by using one or more fasteners or the like (not shown).

With reference to FIGS. 3, 4, 23, and 24, each one of the electric component access openings 62a, 62b, 64 and 66 formed in the cover 58 are sized so an adjacent portion of the rear cover face 316 bears against part of the respective electric component 52a, 52b, 54 and 56 when plugged into the board 44 helping to keep the component 52a, 52b, 54 and 56 securely seated in the board 44 when the cover 58 is attached to the enclosure 42. As is best shown in FIG. 23, each duplex receptacle access opening 62a and 62b formed in the cover 58 include a pair of spaced apart outlet windows 328 and 330 between which is disposed a hold down brace 332 that overlies the interconnecting bridge 99 of the outlet plate 92 that extends between the outlets 94 and 96 of each duplex receptacle 52a and 52b keeping each receptacle 52a and 52b seated in the board 44 when the cover 58 is attached to the enclosure 42.

In a preferred control panel cover embodiment, such as depicted in FIG. 23, the rear cover face 316 has a plurality of duplex receptacle abutment seats 334a and 334b that include a flange 336 upraised from the face 316 that defines the respective outlet windows 328 and 330 and which engage against part of the outlet plate 92 surrounding each outlet 94 and 96. When the control panel cover 58 is attached to the enclosure 42, such as depicted in FIG. 24, each receptacle seat 334a and 334b of the cover 58, including its hold down brace 332 and flange 336 abut against the outlet plate 92 of the duplex receptacle 52a and 52b such that the seat 334a and 334b overlies urging each duplex receptacle 52a and 52b into firm engagement with the board 44.

Figure 24:
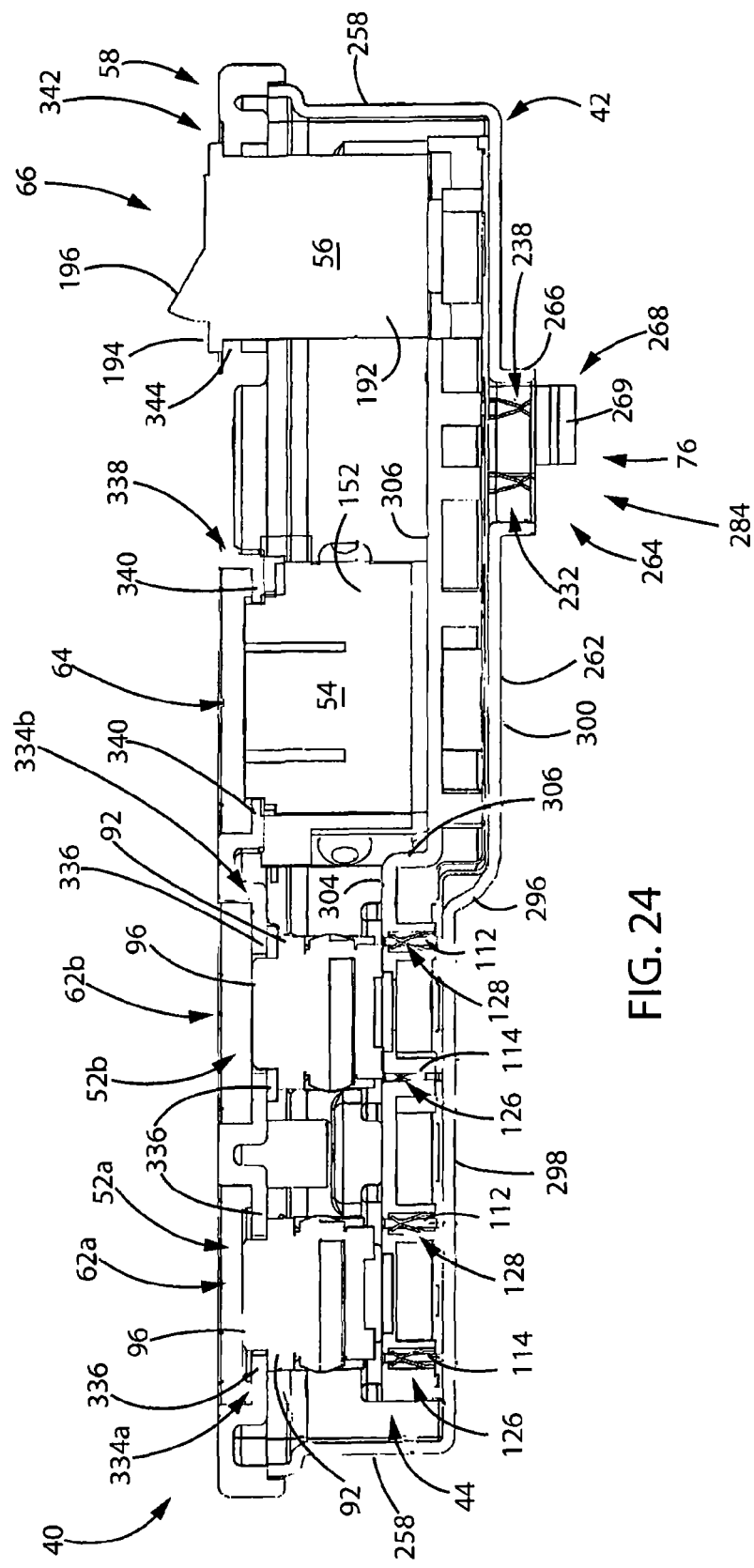
FIG. 24 is a cross-sectional view of the assembled control panel shown in FIGS. 1 and 2 illustrating how the control panel cover keeps the electrical components plugged into the electrical component board while also keeping the board seated in the enclosure when the cover is attached to the enclosure.

Similarly, as is also depicted in FIGS. 23 and 24, the rear cover face 316 of the control panel cover 58 has a 120/240 volt receptacle abutment seat 338 that includes a generally circular flange 340 upraised from the face 316 bounding the 120/240 volt receptacle access opening 62 that encircles an outer periphery of the outlet 150 of a 120/240 volt receptacle 54 plugged into the board 44 bearing against the base 152 of the receptacle 54 helping to keep the receptacle 54 firmly and securely seated in the board 44 when the cover 58 is attached to the enclosure 42. Finally, the rear cover face 316 can also include a circuit breaker retainer abutment seat 342 having an upraised flange 344 encompassing the circuit breaker access opening 66 that engages part of the circuit breaker 56, such as part of its housing 192 or cover plate 194, in a manner that helps securely keep the circuit breaker 56 plugged into the board 44.

When the control panel module 72 is completely assembled, such as shown in FIGS. 1, 2, 25 and 26, the electrical components 52a, 52b, 54 and 56 plugged into the electrical component mounting board 44 remain securely seated in the board 4 by being sandwiched between the enclosure 42 and cover 58. In a preferred embodiment, at least the duplex receptacles 52a and 52b remain securely seated in this manner without using any fastener to attach the receptacles 52a and 52b to the board 44. In another preferred embodiment, all of the power receptacles 52a, 52b, and 54 remain securely seated in the board 44 without using any fastener to attach any power receptacle 52a, 52b, and 54 without using any fastener with the power receptacles 52a, 52b, and 54 held seated in the board 44 by being sandwiched between the enclosure 42 and cover 58. If desired, one or more fasteners, such as screws, bolts, Christmas tree fasteners, clips, tabs, fingers, or other like can be used to anchor, secure or otherwise attached the receptacles 52a, 52b and/or 54 to the board 44 and/or cover 58.

Figure 25:
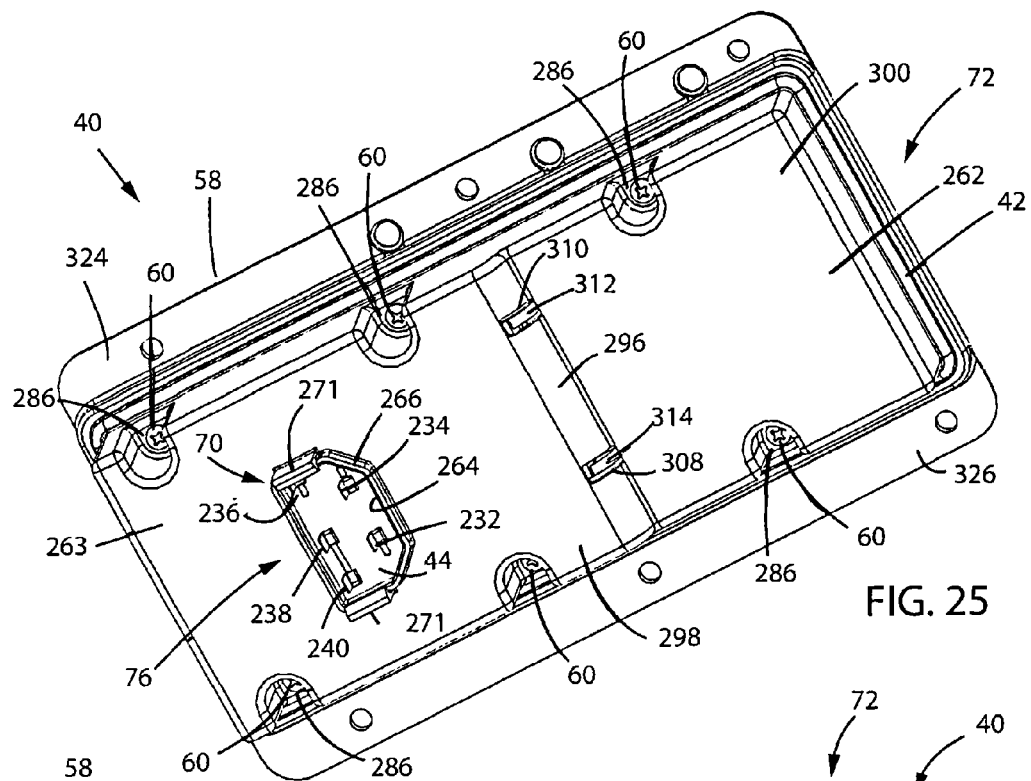
FIG. 25 is a rear perspective view of the control panel module after assembly has been completed.
Figure 26:
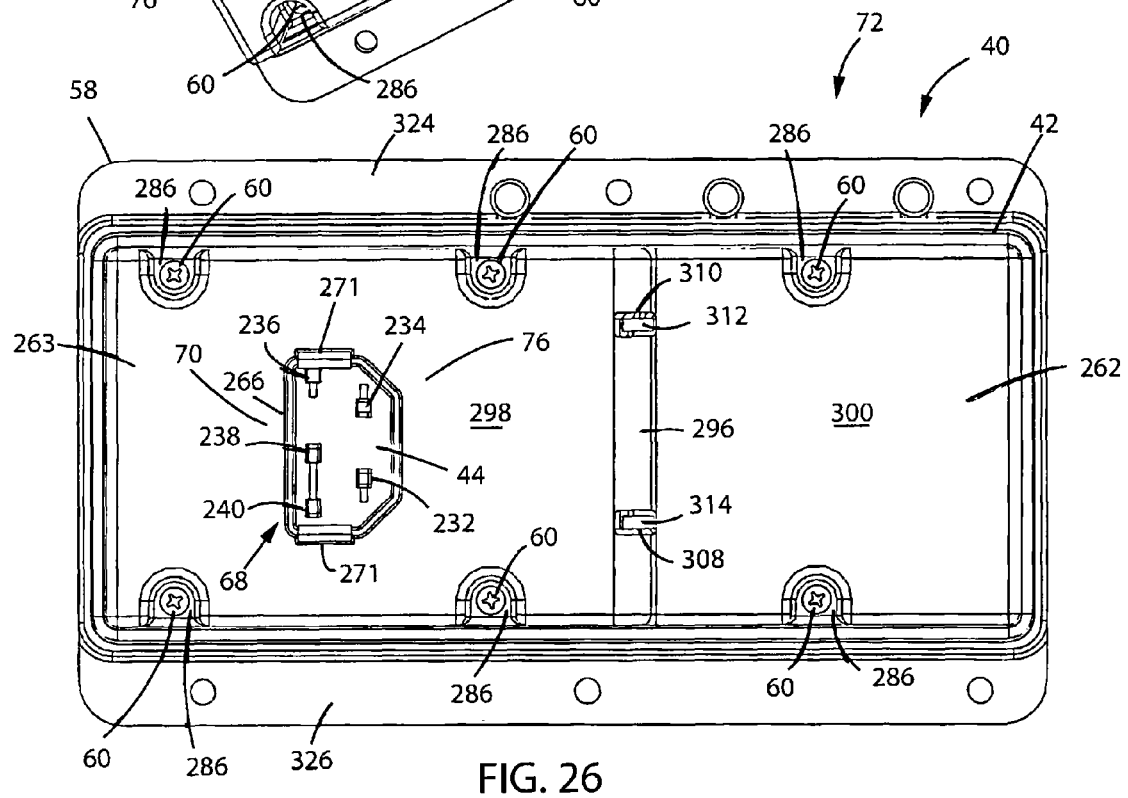
FIG. 26 is a rear plan view of the control panel module after assembly has been completed.

FIGS. 25 and 26 illustrate the rear of the control panel module 72 after assembly has been completed. To complete assembly, the seating rib 318 of the cover 58 shown in FIG. 23 is received in the cover seat 290 shown in FIGS. 3 and 17-19 formed along the top or outer edge of the enclosure 42 capturing the electrical components 52a, 52b, 54 and 56 and board 44 between the enclosure 42 and cover 58. The cover 58 is then attached to the enclosure 42 using a plurality of fasteners 60 that each extend through a corresponding mounting tab 286 of the enclosure 42 and threaded into a respective mounting post 320 of the cover 58.

If desired, the cover 58 can be attached using one or more clips, Christmas tree fasteners, tabs, fingers or another type of fastener(s) enabling the cover 58 to snap onto the enclosure 42 including in a manner providing releasable attachment. If desired, such fasteners or arrangement of fasteners can be configured for snap-fit construction enabling snap-fit engagement between the cover 58 and the enclosure 58.

Thereafter, the socket 76 formed in a rear surface 263 of the enclosure bottom 262 and part of the bottom 78 of the board 44 configured with contacts 232, 234, 236, 238 and 240 can receive a male plug of an electrical cable or cord that is plugged into the socket 76 during attachment of the module 72 to another piece of equipment, such as a generator, welder, or the like. Where the plug is a female plug, the socket 76' can be configured with outwardly extending terminal blades 346, 348, 350, 352 and 354 extending outwardly from the board 44' shown in FIG. 13. During insertion of such a plug into the socket 76, the body of the plug is urged into the socket opening 264 in slidable engagement with the plug seating lip 266 bounding the opening 264 until the latches 271 of the socket 76 engage a rear edge of the plug.

Once the control panel module 72 is plugged in, fasteners (not shown) can be used to securely mount the module 72 to the piece of equipment. In at least one embodiment, fasteners are used to attach the mounting flanges 324 and 326 of the cover 58 directly to the piece of equipment after the module 72 has been plugged into the piece of equipment as described above securing the module to the piece of equipment.

Understandably, the present invention has been described above in terms of one or more preferred embodiments and methods. It is recognized that various alternatives and modifications may be made to these embodiments and methods which are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A control panel assembly comprising:
    an enclosure having a cavity;
    an electrical component mounting board received in the enclosure cavity, the electrical component mounting board comprising (i) at least one electrical socket comprised of a plurality of spaced apart electrical contacts disposed on one side of the board into which one of the electrical components plugs, and (ii) at least one electrical socket comprised of a plurality of spaced apart electrical contacts disposed on an opposite side of the board comprising an electrical connector socket into which a plug of an electrical connector plugs;
    a plurality of electrical components mounted to the board by being plugged into a corresponding at least one electrical socket; and
    a cover attached to the enclosure; and
    wherein the board is formed of an electrically insulating board housing that encloses an electrically conductive layer within the board housing, wherein the electrical contacts of the at least one electrical socket disposed on one side of the board are integrally formed of the electrically conductive inner layer and extend outwardly therefrom in one direction, and wherein the electrical contacts of the at least one electrical socket disposed on the other side of the board are integrally formed of the electrically conductive inner layer and extend outwardly therefrom in an opposite direction; and
    wherein the cover has an access opening formed therein providing user access through the cover to one of the electrical components plugged into at least one socket disposed on the one side of the board, and wherein the enclosure has a socket opening formed therein in registry with the electrical connector socket disposed on the opposite side of the board.

2. The control panel assembly of claim 1 wherein at least one of the plurality of components comprises a 120 volt duplex receptacle plugged into a corresponding one of the sockets disposed on the one side of the board, the 120 volt duplex receptacle comprised of an outlet plate having a pair of 120 volt outlets each having a pair of parallel spaced apart electrical plug blade or prong-receiving slots and an electrical ground opening formed therein, and wherein the access opening formed in the cover substantially completely exposes the 120 volt outlets of the 120 volt duplex receptacle and the cover comprises an abutment seat that abuts against the 120 volt duplex receptacle keeping the 120 volt duplex receptacle plugged into the corresponding one of the sockets disposed on the one side of the board when the cover is attached to the enclosure.

3. The control panel assembly of claim 1 wherein at least one of the plurality of components comprises a generally round electrical power receptacle plugged into a corresponding one of the sockets disposed on the one side of the board, the generally round electrical power receptacle having an outlet comprised of a plurality of plug blade or prong-receiving slots, and wherein the access opening formed in the cover substantially completely exposes the outlet of the generally round electrical power receptacle, the access opening defined by an annular abutment seat that abuts against the generally round electrical power receptacle keeping the generally round electrical power receptacle plugged into the corresponding one of the sockets disposed on the one side of the board when the cover is attached to the enclosure.

4. The control panel assembly of claim 1 wherein the plurality of contacts of the electrical connector socket each extend outwardly from the board and wherein the socket opening formed in the enclosure is defined by a plurality of spaced apart sides and overlies the electrical connector socket contacts defining a recessed socket extending into the enclosure in which a plug is received that can plug into the electrical connector socket.

5. The control panel assembly of claim 4 wherein the enclosure has a rear wall opposite the cover and wherein the socket opening overlying the electrical connector socket of the board is formed in the rear wall of the enclosure.

6. The control panel assembly of claim 1 wherein each one of the electrical components have a plurality of spaced apart electrical terminals each received in an opening in the board housing making an electrical connection with a corresponding terminal-engaging contact of a corresponding one of the electrical sockets disposed on the one side of the board when plugged into the corresponding one of sockets disposed on the one side of the board, and wherein each terminal engaging contact is comprised of a pair of resilient and flexible contact leafs disposed within the board housing that are each integrally formed of the electrically conductive layer that are biased into engagement with one another that make electrical contact with opposite sides of a corresponding terminal of the respective electrical component when plugged into the corresponding one of the electrical sockets.

7. The control panel assembly of claim 6 wherein (a) the at least one electrical component comprises an electrical power receptacle having a plurality of pairs of electrical contacts with at least one of the electrical contacts comprising a hot contact, at least one of the electrical contacts comprising a neutral contact, and at least one of the electrical contacts comprising a ground contact, (b) the electrical socket is comprised of a plurality of pairs of electrical contacts with at least one of the electrical contacts comprising a hot contact, at least one of the electrical contacts comprising a neutral contact, and at least one of the electrical contacts comprising a ground contact, (c) each one of the electrical contacts of the electrical power receptacle electrical connects with a corresponding one of the electrical contacts of the electrical socket when the electrical power receptacle is plugged into the electrical socket, and (d) one of the electrical contacts of the electrical power receptacle electrically engages a corresponding one of the electrical contacts of the electrical socket when the electrical power receptacle is plugged into the electrical socket locating the electrical power receptacle relative to the electrical component mounting board.

8. The control panel assembly of claim 7 wherein the electrical contact of the electrical power receptacle that electrically engages the corresponding electrical contact of the electrical socket and locates the electrical power receptacle relative to the electrical component mounting board each comprises a ground contact.

9. The control panel assembly of claim 8 wherein (a) the electrical power receptacle comprises at least one outlet configured for receiving a three prong electrical plug, (b) the cover has an access opening formed therein enabling a plug to be inserted into the at least one outlet of the electrical power receptacle, and (c) the electrical power receptacle is located relative to the access opening formed in the cover so the access opening overlies the at least one outlet when the electrical power receptacle is plugged into the electrical component mounting board, the electrical component mounting board is received in the enclosure cavity, and the cover is attached to the enclosure.

10. The control panel assembly of claim 8 wherein the electrical power receptacle comprises a duplex receptacle having a pair of outlets and wherein the duplex receptacle is electrically located when plugged into the electrical component mounting board in a manner that ensures proper polarity of each outlet of the duplex receptacle.

11. The control panel assembly of claim 7 wherein the plurality of pairs of electrical power receptacle are arranged generally in a square and the plurality of pairs of electrical contacts of the electrical socket are arranged generally in a square wherein plugging the electrical power receptacle into the electrical socket locates the electrical power receptacle relative to the electrical component mounting board.

12. The control panel assembly of claim 11 wherein the electrical power receptacle comprises a twist lock receptacle having four electrical contacts with a first pair of the electrical contacts being opposed and generally parallel to another and a second pair of the electrical contacts being opposed and generally parallel to one another and wherein the electrical socket has four electrical contacts with a first pair of the electrical contacts being opposed and generally parallel to another and a second pair of the electrical contacts being opposed.

13. The control panel assembly of claim 12 wherein (a) the twist lock receptacle comprises an outlet configured for receiving an electrical plug having a plurality of pairs of prongs, (b) the cover has an access opening formed therein enabling a plug to be inserted into the outlet of the twist lock receptacle, and (c) the electrical power receptacle is located relative to the access opening formed in the cover so the access opening overlies the outlet when the twist lock receptacle is plugged into the electrical component mounting board, the electrical component mounting board is received in the enclosure cavity, and the cover is attached to the enclosure.

14. The control panel assembly of claim 1 wherein the electrical component mounting board has a plurality of electrical sockets disposed on the one side of the board with each electrical socket disposed on the one side of the board comprised of a plurality of spaced apart electrical contacts disposed within the board housing in registry with a corresponding slot formed in the board housing, wherein the slots and contacts of one of the plurality of electrical sockets are disposed in a generally rectangular arrangement having a first pair of generally parallel spaced apart slots and contacts disposed between and generally perpendicular to a second pair of generally parallel spaced apart slots and contacts, wherein at least one of the electrical components comprises an electrical power receptacle having a plurality of pairs of outwardly extending terminal blades with a first pair of generally parallel spaced apart terminal blades disposed between and generally perpendicular to a second pair of generally parallel spaced apart terminal blades, and wherein the generally rectangular arranged slots and contacts of the one of the plurality of electrical sockets disposed on the one side of the board locates the electrical power receptacle when plugged into the one of the plurality of spaced apart electrical sockets disposed on the one side of the board.

15. The control panel assembly of claim 1 wherein the enclosure has a three dimensionally contoured cavity in which the electrical component mounting board is received and wherein the board is three dimensionally contoured mating with a portion of the three dimensionally contoured cavity locating the board relative to the enclose when received in the cavity.

16. The control panel assembly of claim 1 wherein the electrical contacts of one of the at least one electrical socket disposed on one side of the electrical component mounting board and at least one electrical socket disposed on the other side of the electrical component mounting board comprise female contacts.

17. The control panel assembly of claim 16 wherein the electrical component mounting board comprises an insert molded circuit board having a pair of electrically insulating outer layers enclosing an electrically conductive layer stamped to form (a) the female contacts of the at least one electrical socket disposed on one side of the insert molded circuit board facing in one direction, and (b) the female contacts of the at least one electrical socket disposed on the other side of the insert molded circuit board facing in the opposite direction.

18. The control panel assembly of claim 1 wherein the electrical contacts of one of the at least one electrical socket disposed on one side of the electrical component mounting board and at least one electrical socket disposed on the other side of the electrical component mounting board comprise male contacts.

19. The control panel assembly of claim 18 wherein the electrical component mounting board comprises an insert molded circuit board having a pair of electrically insulating outer layers enclosing an electrically conductive layer stamped to form (a) the male contacts of the at least one electrical socket disposed on one side of the insert molded circuit board facing in one direction, and (b) the male contacts of the at least one electrical socket disposed on the other side of the insert molded circuit board facing in the opposite direction.

20. The control panel assembly of claim 1 wherein the electrical contacts of one of the at least one electrical socket disposed on one side of the electrical component mounting board and at least one electrical socket disposed on the other side of the electrical component mounting board comprise male contacts and the electrical contacts of the other one of the at least one electrical socket disposed on one side of the electrical component mounting board and at least one electrical socket disposed on the other side of the electrical component mounting board comprise female contacts.

21. The control panel assembly of claim 20 wherein the electrical component mounting board comprises an insert molded circuit board having a pair of electrically insulating outer layers enclosing an electrically conductive layer stamped to form (a) the male contacts of the at least one electrical socket disposed on one side of the insert molded circuit board facing in one direction, and (b) the female contacts of the at least one electrical socket disposed on the other side of the insert molded circuit board facing in the opposite direction.

22. The control panel assembly of claim 1 wherein the at least one of the plurality of components comprises a 120 volt duplex receptacle plugged into a corresponding one of the electrical sockets disposed on the one side of the board, the 120 volt duplex receptacle having a plurality of pairs of outwardly extending terminal blades received in a corresponding slot in engagement with a respective contact of the one of the electrical sockets disposed on the one side of the board locating the 120 volt duplex receptacle when plugged into the corresponding one of the electrical sockets disposed on the one side of the board, and wherein the board is three-dimensionally configured to help locate the 120 volt duplex receptacle when plugged into the corresponding one of the electrical sockets disposed on the one side of the board.

23. The control panel assembly of claim 1 wherein the socket opening formed in the enclosure comprises a coupling having a plurality of spaced apart plug-engaging latches.

24. A control panel assembly comprising:
an enclosure having a cavity defined by a plurality of spaced apart sidewalls and a rear wall;
an electrical component mounting board received in the enclosure cavity, the board comprising an insert molded circuit board having an electrically conductive inner layer within an electrically insulating outer housing of the board, the board having a plurality of electrical sockets integrally formed of the board disposed on one side of the board and at least one electrical socket integrally formed of the board disposed on an opposite side of the board, each one of the electrical sockets disposed on the one side of the board comprised of a plurality of slots formed in the electrically insulating outer board housing with each slot disposed in registry with a corresponding one of a plurality of electrical contacts recessed within the electrically insulating outer housing of the board integrally formed of the electrically conductive inner layer;
a plurality of electrical components plugged into a corresponding one of the sockets with at least one of the electrical components comprising a power receptacle having a power outlet and a plurality of outwardly extending terminal blades each received in a corresponding slot of a respective one of the electrical sockets and disposed in electrical engagement with a corresponding one of the recessed electrical contacts of the respective one of the electrical socket into which the power receptacle is plugged; and
a cover attached to the enclosure capturing the electrical components plugged into the board between the cover and enclosure, the cover having an access opening formed therein through which the power outlet is exposed; and
wherein the rear wall of the enclosure has a socket opening formed therein exposing the at least one socket disposed on the opposite side of the board permitting a plug to extend into the enclosure and be plugged into the at least one socket disposed on the opposite side of the board.

25. The control panel assembly of claim 24 wherein each socket is comprised of a plurality of spaced apart terminal blade receiving slots formed in an electrically insulating housing of the board that each lie in registry with a terminal blade engaging contact disposed within the housing of the board and wherein the plurality of electrical components have a plurality of outwardly extending terminal blades that are received in a corresponding slot of the socket into which the electric component is plugged and disposed in engagement with a respective terminal blade engaging contact of the socket into which the electrical component is plugged.

26. The control panel assembly of claim 25 wherein the plurality of electrical sockets into which the electrical components are respectively plugged are disposed on one side of the board facing in one direction and wherein the board further comprises an electrical socket integrally formed of the electrically conductive inner layer within the board that is disposed on an opposite side of the board facing in an opposite direction.

27. The control panel assembly of claim 26 wherein the enclosure has a socket opening in registry with the electrical socket disposed on the opposite side of the board configured for receiving a plug connected to an electrical cable or cord.

* * * * *